(12) United States Patent
Batista Estévez

(10) Patent No.: US 12,496,609 B2
(45) Date of Patent: Dec. 16, 2025

(54) OSCILLATING SPRINKLER ASSEMBLY

(71) Applicant: K-RAIN MANUFACTURING CORP., Riviera Beach, FL (US)

(72) Inventor: Hanlly R. Batista Estévez, Lake Park, FL (US)

(73) Assignee: K-Rain Manufacturing Corp., Riviera Beach, FL (US)

( * ) Notice: Subject to any disclaimer, the term of this patent is extended or adjusted under 35 U.S.C. 154(b) by 0 days.

(21) Appl. No.: 17/481,935

(22) Filed: Sep. 22, 2021

(65) Prior Publication Data

US 2023/0088593 A1 Mar. 23, 2023

(51) Int. Cl.
| | | |
|---|---|---|
| *B05B 15/74* | (2018.01) | |
| *B05B 3/04* | (2006.01) | |
| *A01G 25/00* | (2006.01) | |

(52) U.S. Cl.
CPC ............ *B05B 15/74* (2018.02); *B05B 3/0432* (2025.08); *A01G 25/00* (2013.01)

(58) Field of Classification Search
CPC ..... B05B 15/74; B05B 3/0418; B05B 3/0431; A01G 25/00

USPC ................................................. 239/203–206
See application file for complete search history.

(56) References Cited

U.S. PATENT DOCUMENTS

2007/0007364 A1* 1/2007 Gregory ................ B05B 1/3006
239/206

\* cited by examiner

*Primary Examiner* — Christopher S Kim
(74) *Attorney, Agent, or Firm* — Amster, Rothstein & Ebenstein LLP

(57) ABSTRACT

An oscillating sprinkler assembly includes a body including an inlet configured for connection to a water supply; a riser movably mounted in the body and movable from a retracted position to an extended position; a nozzle housing rotatably mounted on a top of the riser; a pressure regulating assembly mounted at an inlet of the riser and operable to control pressure of water into the riser based on an downstream pressure; a water turbine mounted downstream of the pressure regulating assembly such that water from the pressure regulating assembly passes through the water turbine to rotated one or more blades thereof, wherein the one or more blades are operatively connected to the nozzle housing and drive rotation of the nozzle housing; and a bypass valve, provided between the pressure regulating assembly and the water turbine and operable to control water flow to the water turbine.

11 Claims, 26 Drawing Sheets

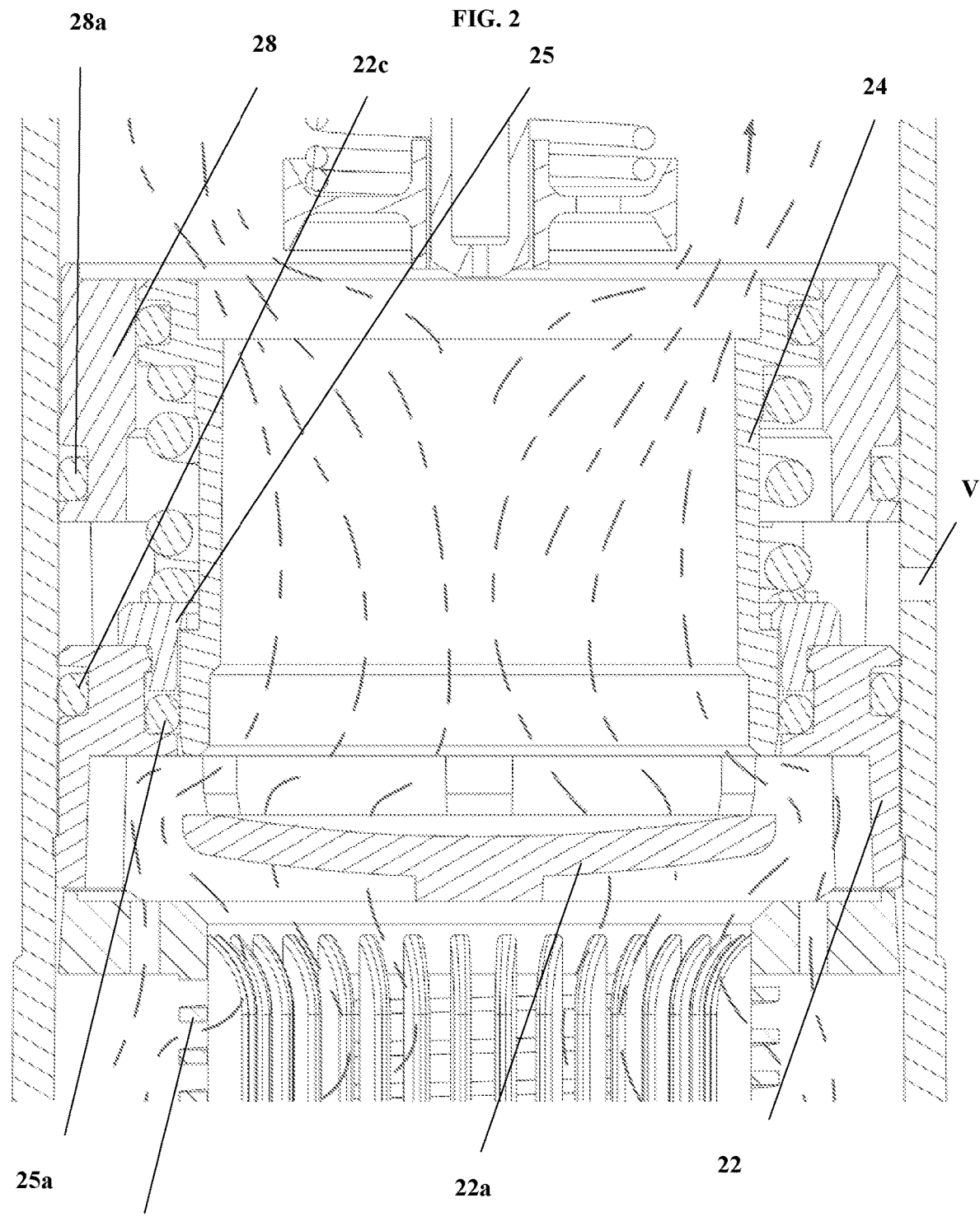

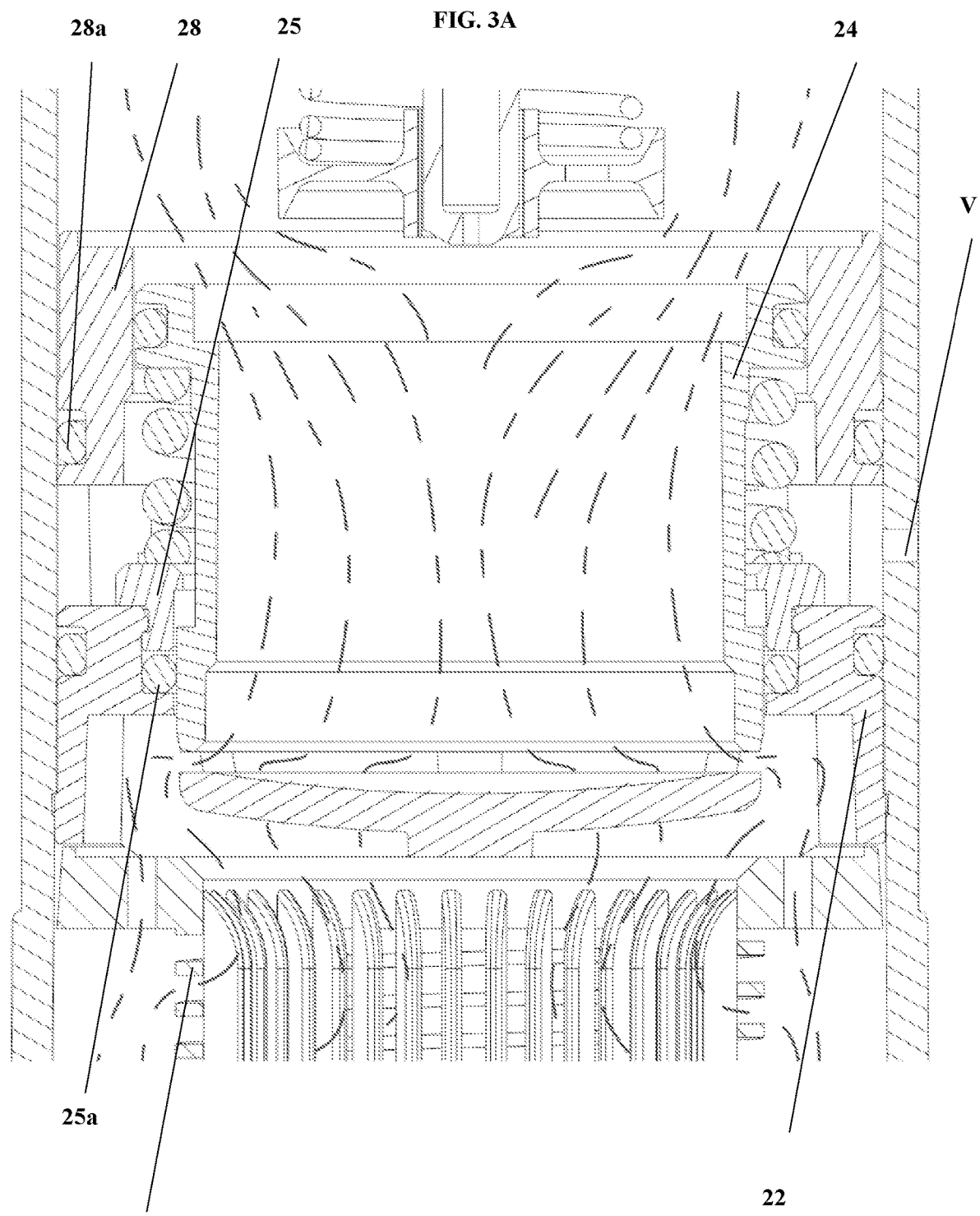

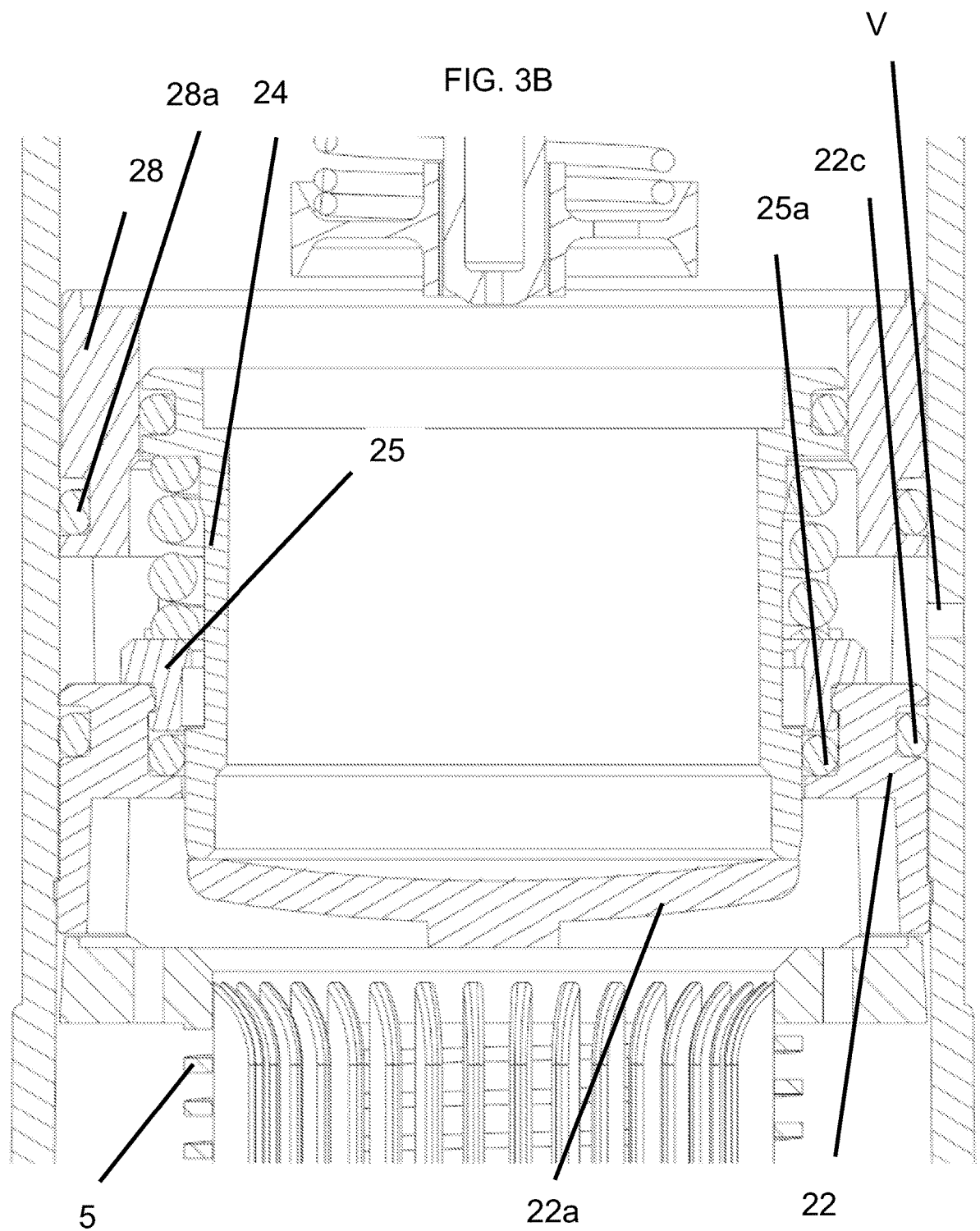

OSCILLATING SPRINKLER ASSEMBLY

BACKGROUND

Field of the Disclosure

The present application relates to an oscillating sprinkler including a pressure regulating assembly and a bypass element positioned upstream from a water turbine drive element. In particular, the present application includes a pressure regulating assembly positioned at an inlet portion of a riser and operable to adjust the pressure of water into the bypass element based on a pressure downstream and a bypass valve positioned downstream of the pressure regulating assembly and configured to selectively direct water through the water turbine without driving the water turbine.

Description Of The Art

U.S. Pat. No. 4,867,378 discloses an oscillating sprinkler assembly including a water turbine drive element configured to rotate a nozzle assembly rotatably mounted on a riser thereof. One shortcoming of oscillating sprinkler assemblies such as that disclosed in U.S. Pat. No. 4,867,378 is that they do not include effective pressure regulation elements responsive to changes of supply water pressure which may result in erratic watering patterns. For example, changes in water pressure may result in non-uniform discharge from the sprinkler assembly which may include changes in discharge distance and/or pattern. In addition, pressure variations may result in inconsistent flow rates in the sprinkler assembly as well. Further, changes in supply pressure may result in increased rotation speeds, which may damage or increase wear in the sprinkler assembly Accordingly, it would be beneficial to provide an oscillating sprinkler assembly that avoids the problems noted above.

SUMMARY

An oscillating sprinkler assembly in accordance with an embodiment of the present disclosure includes a pressure regulating assembly provided at an inlet of the riser and movable to control pressure of water into the riser and a bypass valve mounted downstream of the pressure regulating assembly and movable to selectively direct at least a portion of the water through the water turbine without driving the turbine.

A sprinkler assembly in accordance with an embodiment of the present disclosure includes: a body including an inlet configured for connection to a water supply; a riser movably mounted in the body and movable from a retracted position to an extended position; a nozzle housing rotatably mounted on a top of the riser; a pressure regulating assembly mounted at an inlet of the riser and operable to control pressure of water into the riser based on a downstream pressure; a bypass valve, provided separately downstream of the pressure regulating assembly and operable to control water flow; and a water turbine mounted downstream of the bypass valve such that water from the bypass valve passes through the water turbine to rotate one or more blades thereof, wherein the one or more blades are operatively connected to the nozzle housing and drive rotation of the nozzle housing.

In embodiments, the pressure regulating assembly includes: a base mounted at the inlet of the riser; a pressure responsive element mounted downstream of the base and movable from a raised position where flow of water between a bottom edge of the pressure responsive element and the base is substantially unimpeded and a lowered position where the flow of water between the lower edge of the pressure responsive element and the base is reduced such that flow of water is restricted to reduce water pressure downstream; a stationary top ring; a securing ring connected to pressure responsive element; a biasing element positioned between the pressure responsive element and the securing ring and configured to bias the pressure responsive element into the raised position, wherein the pressure responsive member moves toward the base when a pressure downstream of the bypass valve assembly exceeds a threshold value.

In embodiments, the bypass valve includes: a bypass base; a bypass movable element mounted in the bypass base and movable between a closed position wherein water is diverted around the bypass base and an open position in at least a portion of the water exiting the pressure response element passes through the bypass base and the turbine substantially perpendicular to one or more blades of the water turbine such that the water blades are impacted without imparting rotation.

In embodiments, at least a portion of the bypass valve is positioned in a top portion of the pressure responsive element.

In embodiments, the bypass valve is positioned downstream of and spaced away from the pressure responsive element.

In embodiments, the pressure responsive member is movable to a closed position to prevent the flow of water between the lower edge of the pressure responsive element and the base.

In embodiments, the sprinkler assembly includes a base seal positioned between an outer wall of the base and an inner wall of the riser to prevent water from passing between the base the riser.

In embodiments. the pressure responsive member further comprises a top seal provided between the top ring and an inner wall of the riser and prevent water from flowing between the top ring and the riser.

In embodiments, the pressure responsive member further comprises a securing seal provided between the securing ring and the pressure responsive element to prevent water from passing between the securing ring and the pressure responsive member.

In embodiments, the sprinkler assembly includes a vent opening formed in the riser adjacent to the pressure regulating element.

In embodiments the vent opening is formed adjacent to the pressure responsive element and provide a reference pressure.

In embodiments, the vent opening is exposed to atmospheric pressure.

In embodiments, a sprinkler assembly in accordance with another embodiment of the present disclosure includes a body including an inlet configured for connection to a water supply; a riser movably mounted in the body and movable from a retracted position to an extended position; a nozzle housing rotatably mounted on a top of the riser; a pressure regulating assembly mounted at an inlet of the riser and operable to control pressure of water into the riser based on a downstream pressure; a bypass valve positioned downstream of the pressure regulating assembly and operable to control water flow, wherein at least a portion of the bypass valve is positioned in the pressure regulating assembly; and a water turbine mounted downstream of the bypass valve such that water from the bypass valve passes through the water turbine to rotate one or more blades thereof, wherein the one or more blades are operatively connected to the nozzle housing and drive rotation of the nozzle housing.

In embodiments, the pressure regulating assembly includes: a base mounted at the inlet of the riser; a pressure responsive element mounted downstream of the base and movable from a raised position where flow of water between a bottom edge of the pressure responsive element and the base is substantially unimpeded and a lowered position where the flow of water between the lower edge of the pressure responsive element and the base is reduced such that flow of water is restricted to reduce water pressure downstream; a stationary top ring; a securing ring connected to and the pressure responsive element; a biasing element positioned between the pressure responsive element and the securing ring and configured to bias the pressure responsive element into the raised position, wherein the pressure responsive member moves toward the base when a pressure downstream of the bypass valve assembly exceeds a threshold value.

In embodiments, the bypass valve includes: a bypass base; a bypass movable element mounted in the bypass base and movable between a closed position wherein water is diverted around the bypass base and an open position in at least a portion of the water exiting the pressure response element passes through the bypass base and the turbine substantially perpendicular to one or more blades of the water turbine such that the water blades are impacted without imparting rotation.

In embodiments, at least a portion of at least one of the bypass base and the bypass movable element is mounted in a top portion of the pressure responsive member.

BRIEF DESCRIPTION OF THE DRAWINGS

FIG. 2 shows a more detailed view of a pressure regulating assembly of the sprinkler assembly of FIG. 1 with a pressure responsive element the raised and inactive position;

FIG. 3A shows a more detailed view of the pressure regulating assembly of the sprinkler assembly of FIG. 1 with the pressure responsive element thereof in a partially lowered position;

FIG. 3B illustrates the pressure regulating assembly of FIG. 1 with the pressure responsive element in a completely lowered position;

DESCRIPTION OF THE EMBODIMENTS

Figure 1A:
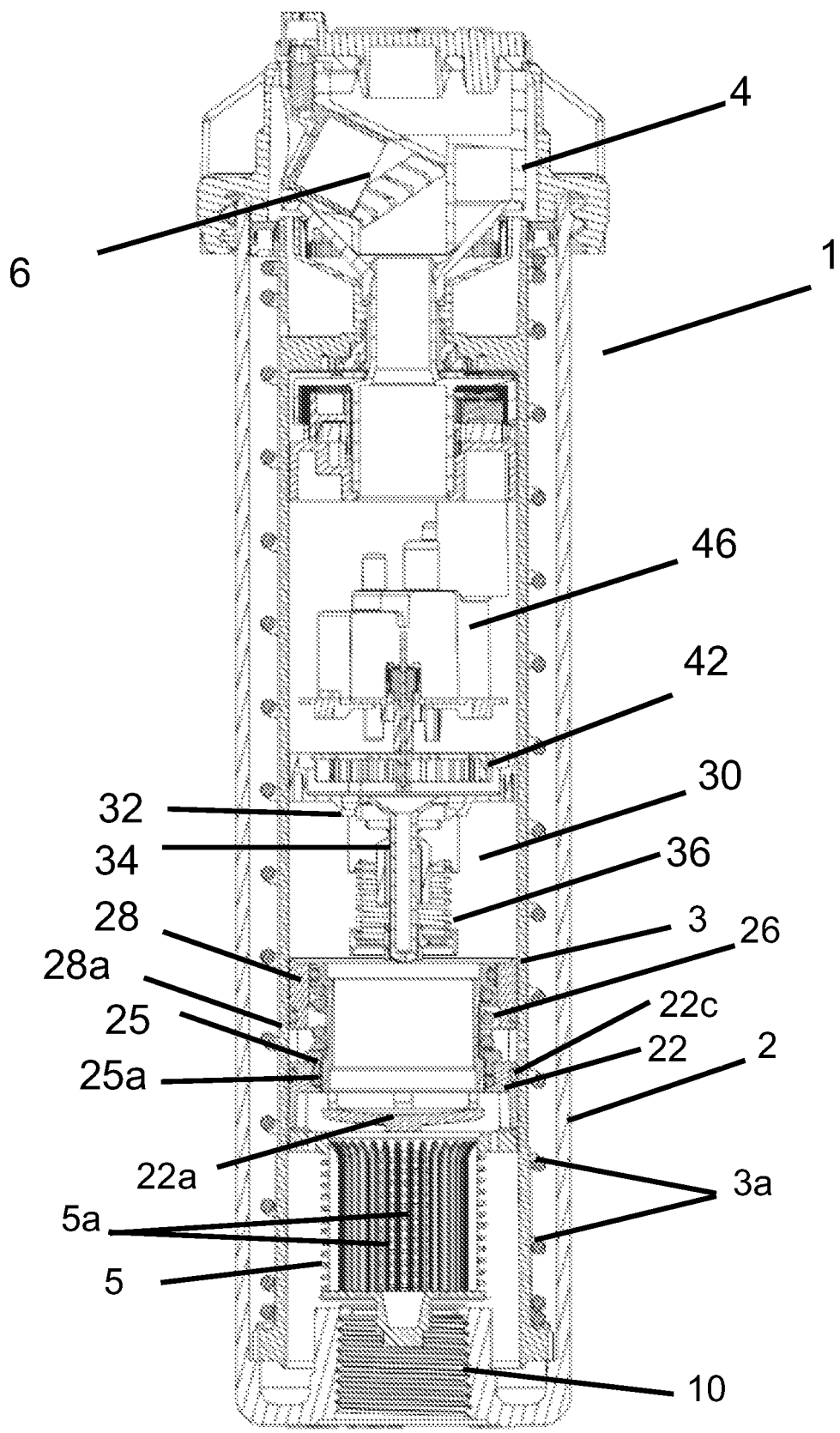
FIG. 1A shows a cross-sectional side elevation view of a sprinkler assembly in accordance with an embodiment of the present invention with a riser in a retracted position and showing a pressure regulating assembly thereof in an inactive position, not regulating the water pressure.
Figure 1B:
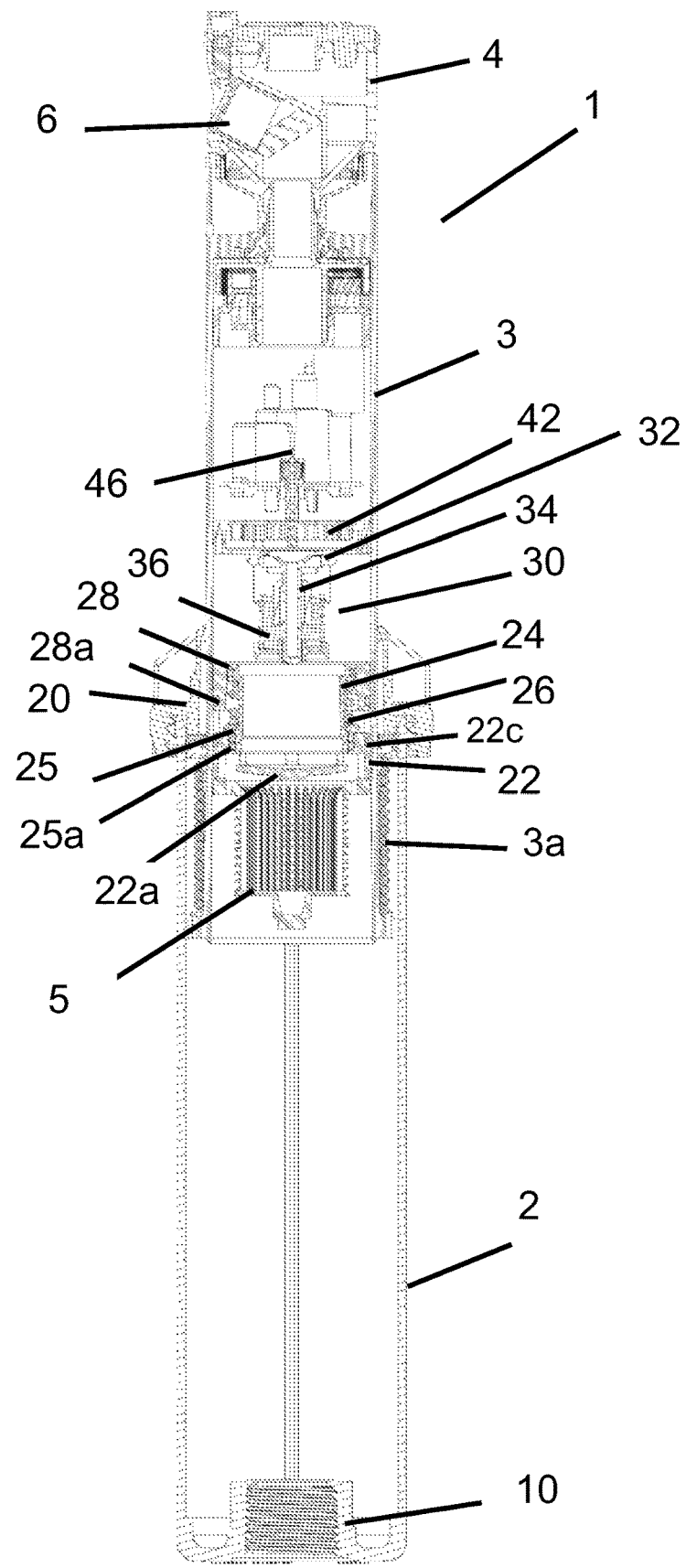
FIG. 1B shows the cross-sectional side elevational view of the sprinkler assembly of FIG. 1 with a riser thereof in an extended position.

An oscillating sprinkler assembly 1 in accordance with an embodiment of the present invention is shown in cross-section in FIGS. 1A and 1B. FIG. 1A illustrates a body 2 including an inlet 10 configured for connection to a supply of water, such as a water supply pipe in an irrigation system, for example. In embodiments, a riser 3 may be movably mounted in the body 2 such that the riser 3 is movable from a closed or retracted position as can be seen in FIG. 1A, for example, to the extended position shown in FIG. 1B, for example. In embodiments, a biasing element 3a may be used to bias the riser 3 in the retracted position. In embodiments, pressure from water provided to the body 2 via the inlet 10 exerts pressure on the riser 3 to move it into the extended position of FIG. 1B. In embodiments, the extended position of FIG. 1B may be an operating position in which water provided to the body 2 passes through the riser 3 and to the nozzle housing 4 and out of the nozzle 6 to exit the sprinkler assembly 1. In embodiments, the nozzle housing 4 may be rotatably mounted on a top of the riser 3 and may be rotatable within a desired arc of rotation.

In embodiments, a filter 5 may be provided at an inlet of the riser 3. In embodiments, the filter 5 may be used to prevent dirt, rocks or other debris from entering the riser 3. In embodiments, water may be provided to the body 2 via the inlet 10 and exerts pressure on the riser 3 to raise it to the extended position of FIG. 1B, as noted above. In embodiments, the water passes through openings 5a provided in the filter 5 and flows upward into the riser 3. In embodiments, a pressure regulating assembly 20 is mounted in the riser 3 downstream of the filter 5. In embodiments, the pressure regulating assembly 20 includes a base 22 mounted above the filter 5 including a plurality of channels 22d (see FIG. 4A-4B, for example) through which water flows into the pressure regulating assembly 20. In embodiments, a base seal 22c may be provided between the outer surface of the base 22 and the riser 3 to prevent water from flowing between the base 22 and the inner wall of the riser 3. In embodiments, the pressure regulating assembly 20 may include a pressure responsive element 24 positioned above the base 22 and movable from a raised position (in FIGS. 1A-1B and 2) in which water flows freely between the bottom edge thereof and the base 22 into the pressure regulating assembly 20 to a lowered position in which water flow into the pressure regulating assembly 20 is restricted (see FIG. 3A, for example) or stopped (see FIG. 3B, for example).

Figure 3C:
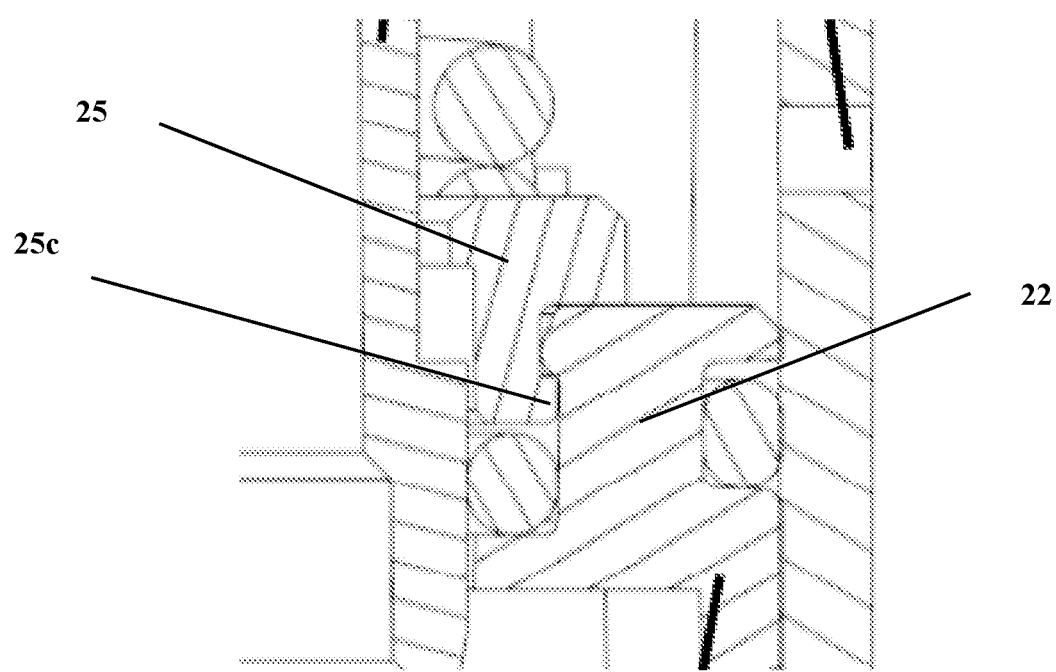
FIG. 3C illustrates a more detailed view of a connection between the securing ring and base of the pressure regulating assembly of FIG. 1.
Figure 4A:
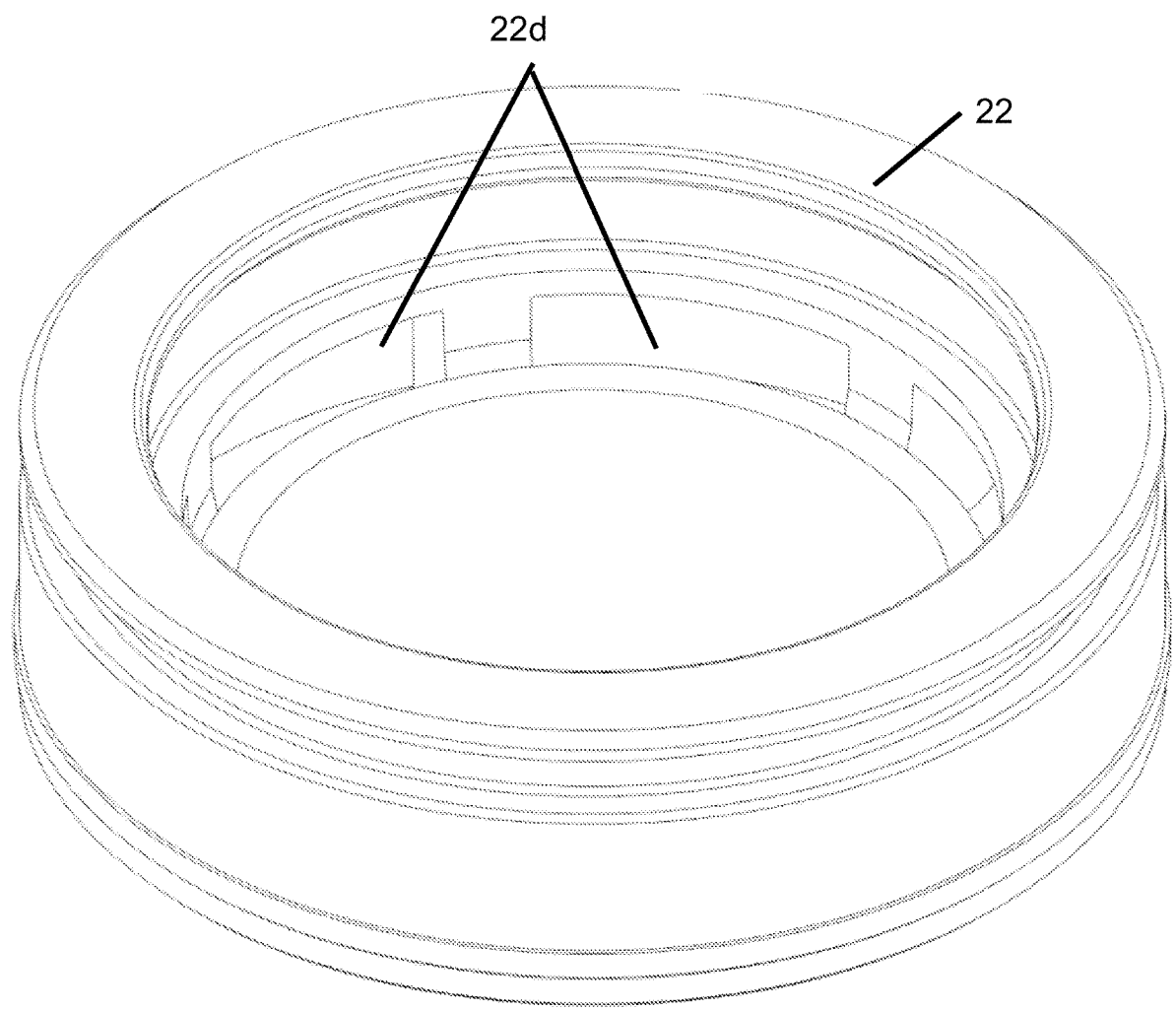
FIG. 4A illustrates a more detailed view of a base of the pressure regulating assembly of FIG. 1.
Figure 4B:
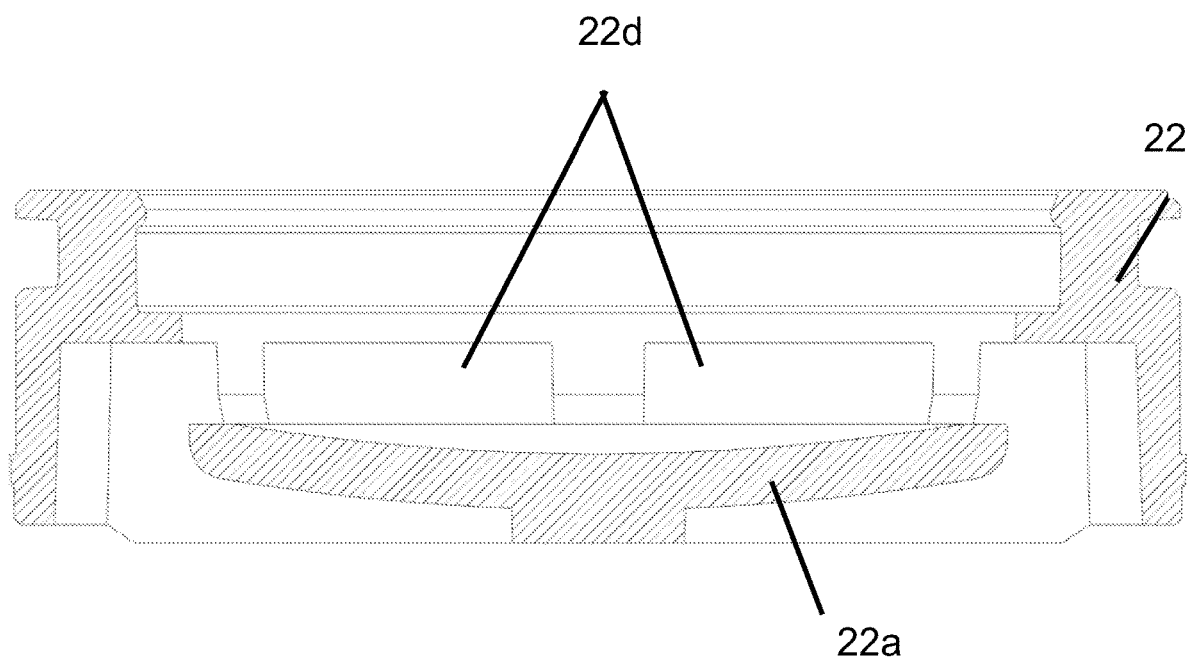
FIG. 4B is a cross-sectional view of the base of FIG. 4A.
Figure 5A:
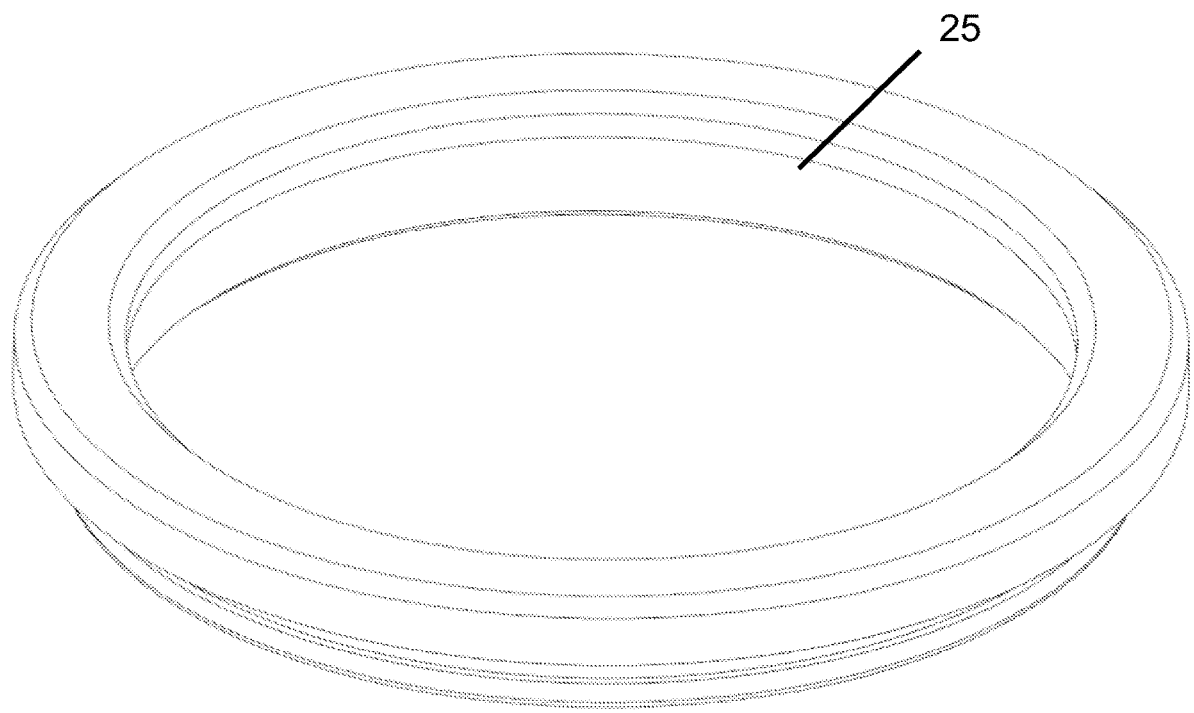
FIG. 5A illustrates a more detailed view of a securing ring of the pressure regulating assembly of FIG. 1.
Figure 5B:
FIG. 5B is a cross-sectional view of the securing ring of FIG. 5A.
Figure 6A:
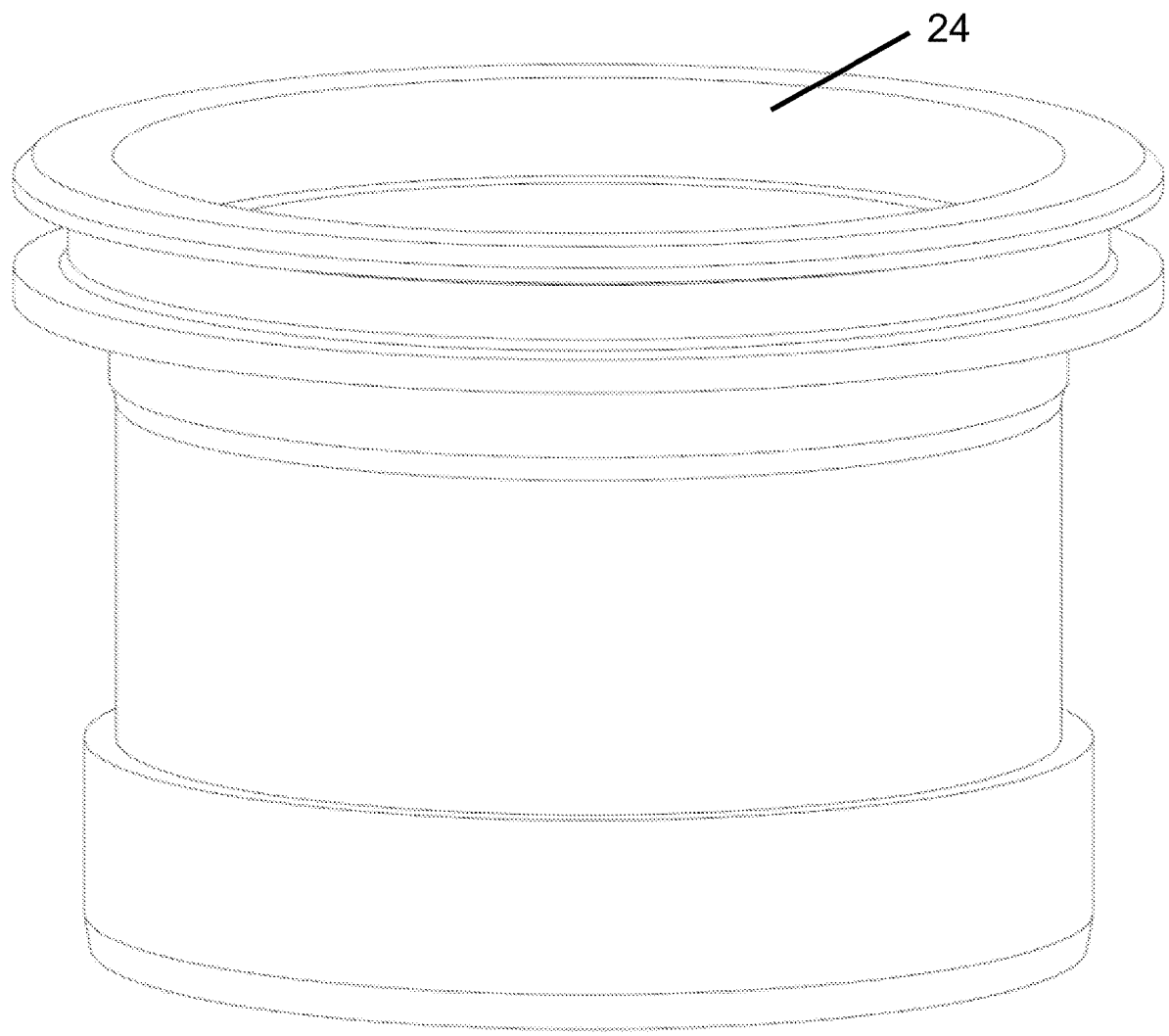
FIG. 6A illustrates a more detailed view of a pressure responsive element of the pressure regulating assembly of FIG. 1.
Figure 6B:
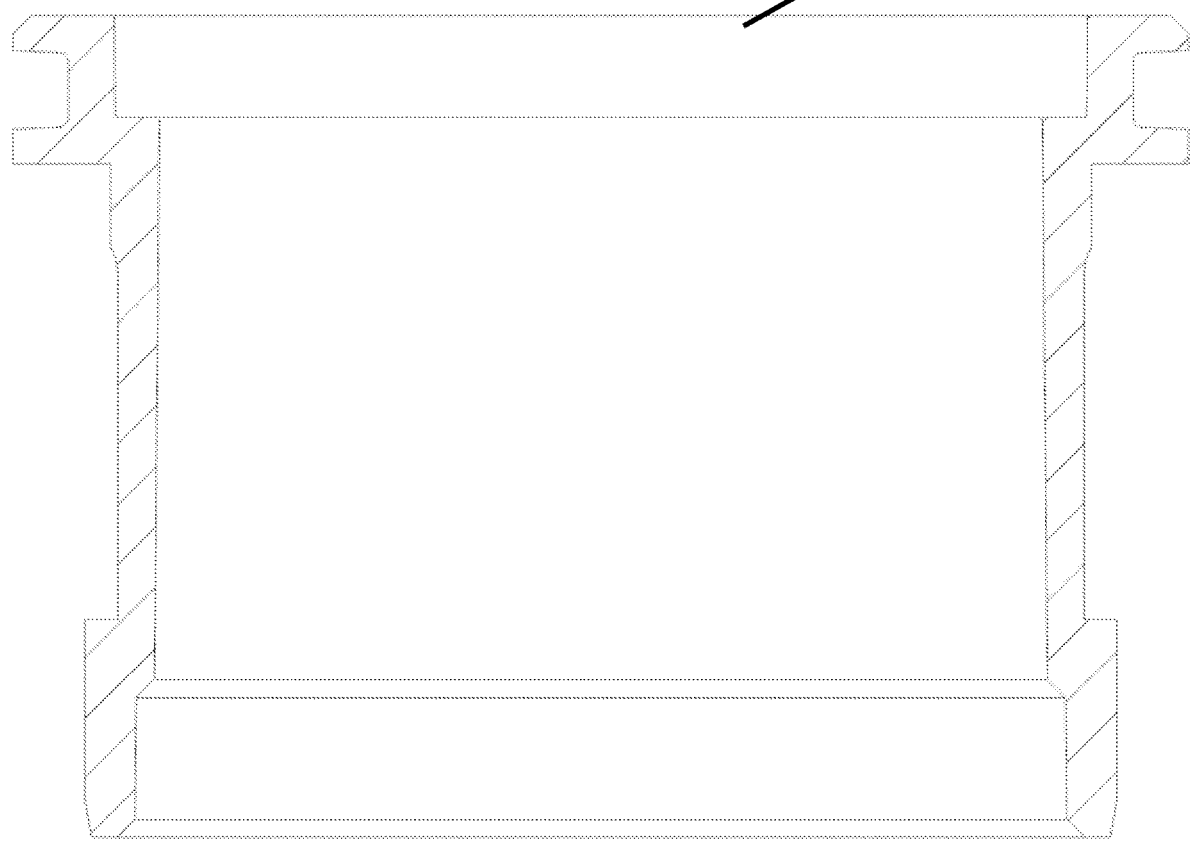
FIG. 6B is a cross-sectional view of the pressure responsive element of FIG. 6A.
Figure 7A:
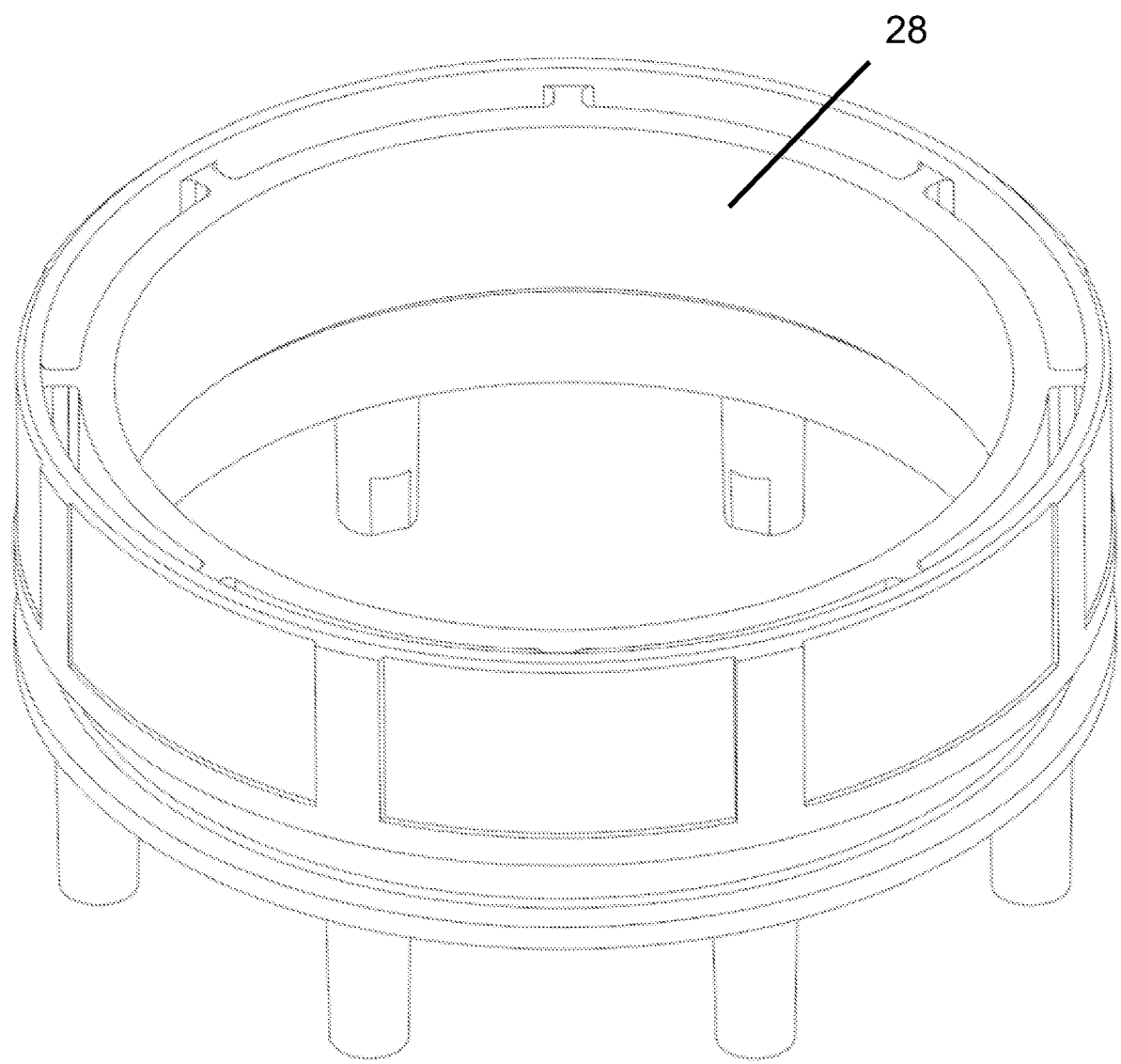
FIG. 7A illustrates a more detailed view of a top ring of the pressure regulating assembly of FIG. 1.
Figure 7B:
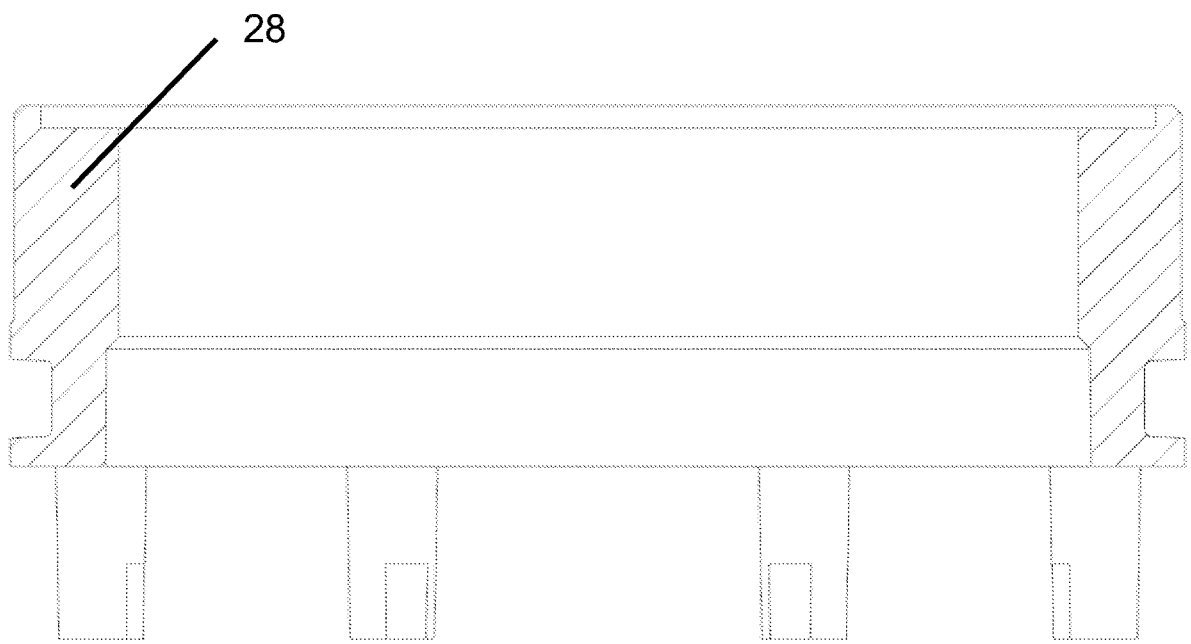
FIG. 7B is a cross-sectional view of a top ring of FIG. 7A.

In embodiments, the base 22 may include a valve seat 22a positioned below the pressure responsive element 24 that interacts therewith to restrict the flow of water as the pressure responsive element 24 moves closer to and eventually contacts the valve seat 22a, as in FIG. 3B, for example, to stop the flow of water. In embodiments, movement of the pressure responsive element 24 may be based on pressure downstream of the pressure regulating assembly 20. The base seal 22c may be provided between the outer wall of the base and the inner wall of the riser 3 to prevent water from flowing around the pressure regulating assembly 20. In embodiments, the position of the pressure responsive element 24 varies depending on changes in the downstream pressure to control flow into the pressure regulating assembly 20, and thus, allow for adjustment of downstream pressure. FIGS. 1A, 1B and 2 show the pressure responsive element 24 in a completely raised, inactive position to allow free flow of water. In embodiments, the area around the biasing element 26 is vented to atmospheric pressure, via the vent opening V, for example (See FIG. 3A, for example) which may serve as a reference pressure compared to the downstream pressure. In embodiments, the biasing element 26 biases the pressure responsive element 24 in the raised position to allow substantially free flow of water until downstream pressure exceeds a threshold value and overcomes the bias force of the biasing element 26 (and the reference pressure) to lower the pressure responsive element 24 toward the base 22 (as indicated in FIG. 3A) and reduce the space between the lower edge of the pressure responsive element 24 and valve seat 22a of the base 22 to restrict the flow of water. In embodiments, the opening V prevents air in the chamber from being compressed, which would result in increased pressure in the chamber and a resulting increase in upward force acting on the pressure responsive element 24. In embodiments, the reference pressure helps maintain a substantially constant upward force acting on the pressure responsive element 24. In embodiments, the biasing element 26 is provided between the securing ring 25 and a top of the pressure responsive member 24 of the pressure regulating assembly 20. In embodiments, the top ring 28 and the securing ring 25 remain stationary. The top ring 28 is illustrated in more detail in FIGS. 7A and 7B. A seal 28a may be provided between an outer surface of the top ring 28 and the riser 3 to prevent water from flowing around the top ring. In embodiments, the base 22 may be held in place using a mechanical stop, such as a step in the riser 3. In embodiments, the base 22 may be held in place using friction, glue and pressure at the inlet of the riser. In embodiments, the top ring 28 may be held in place via friction with the riser 3. In embodiments, the top ring 28 may be pushed down by downstream pressure. In embodiments, the legs 28c may extend down from the top ring 28 and rest on a top of the base 22. In embodiments, since the downstream pressure is always less than the inlet pressure, the pressure regulating assembly 20 will not move down due to friction with an inner wall of the riser 3 and the prevailing high pressure upstream. In embodiments, a securing seal 25a may be provided between the securing ring 25, the pressure responsive element 24 and the base 22 to prevent water from flowing around the pressure responsive element. The securing ring 25 is shown in more detail in FIGS. 5A, 5B. In embodiments, the securing ring 25 may be connected to the base 22 via a snap connection. In embodiments, pressing the securing ring 25 downward during assembly may deform the lower lip 25c (see FIG. 3C, for example) to connect with the base 22.

FIG. 2 shows a more detailed view of the pressure regulating assembly 20 of FIG. 1 with the pressure responsive element 24 is the raised position with the broken lines illustrating the flow of water through the regulating assembly. FIG. 3A illustrates a more detailed view of the pressure responsive element 24 in a partially lowered position restricting the flow of water into the pressure regulating assembly 20 as indicated by the broken lines. FIG. 3B illustrates the pressure responsive element 24 in a lowered position where the flow of water is completely stopped.

Figure 10:
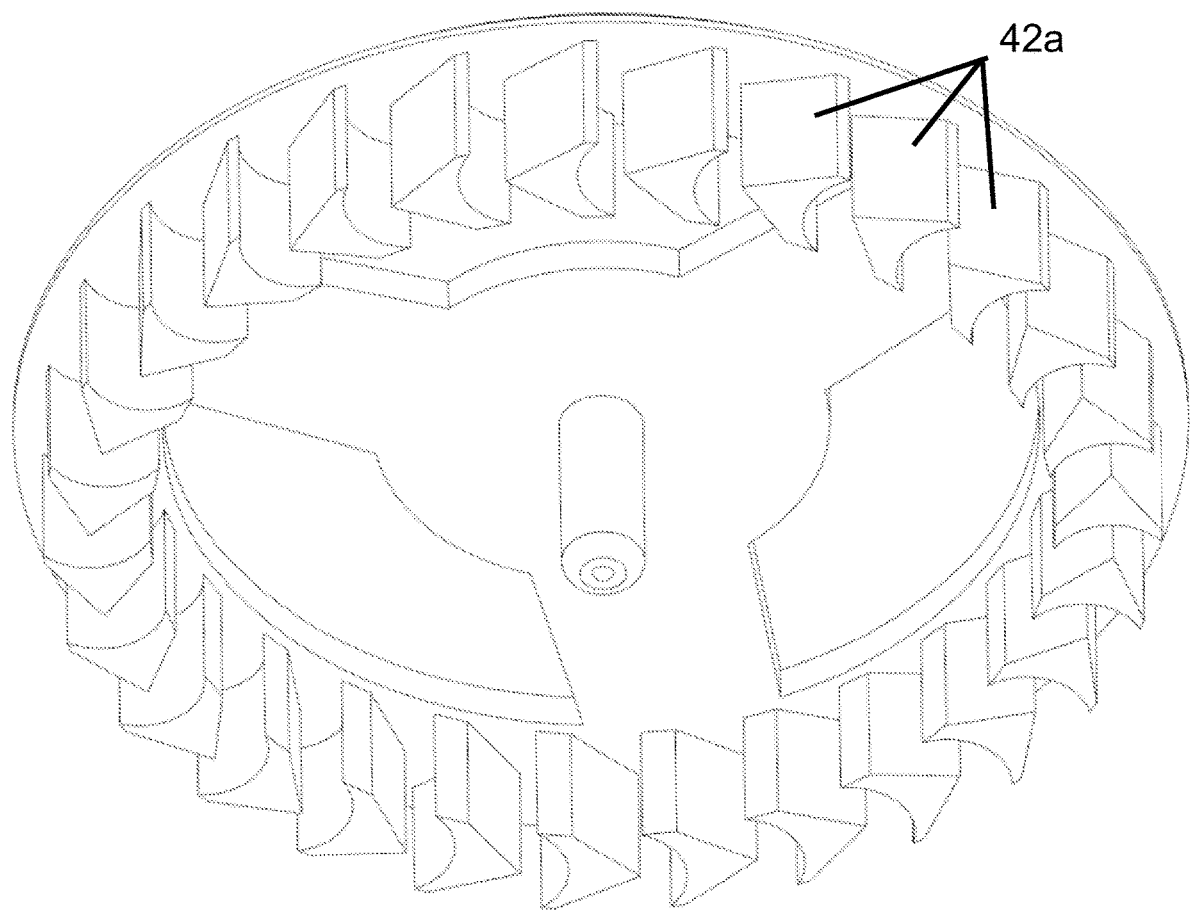
FIG. 10 illustrates a more detailed view of the water turbine in the sprinkler assembly of FIG. 1.

In embodiments, water flows between the lower edge of the pressure responsive element 24 and the outer edge of valve seat 22a and into and through the hollow center portion of the pressure responsive element as indicated by the arrows in FIG. 3A, for example. Thereafter, the water flows upward toward the water turbine 42 which is spaced from a top edge of the pressure responsive element 24. In embodiments, the water flows up through the center of the pressure responsive element 24 and out the top end of the pressure responsive element 24. The water then flows around the bypass valve 30 into transverse passages 44. FIG. 10 illustrates a more detailed view of the blades 42a of the turbine 42. In embodiments, the force of the water on the blades 42a drives rotation of the blades about a central axis of the turbine 42. In embodiments, the blades 42a are operatively connected to the gear system 46 which is operatively connected to the nozzle housing 4 to rotate the nozzle housing on the riser 3. In embodiments, an arc set mechanism (not shown) may be provided to control an arc of rotation of the nozzle housing 4, if desired such that the nozzle housing 4 rotates back and forth in a desired arc of coverage.

In operation, water is provided through the inlet 10 and into the body 2. As pressure builds in the body, the riser 3 extends upward. Water flows through the filter 5 and into the pressure regulating assembly 20 mounted at the inlet of the riser 3. Water flows through the openings 5a in the filter 5 and passes between the valve seat 22a of the base 22 and the pressure responsive element 24 when the pressure responsive element is in the raised, inactive position of FIGS. 1A, 1B and 2 or the partially lowered position of FIG. 3A. In embodiments, however, where the water pressure downstream of the pressure regulating assembly 20 exceeds a threshold value such that it overcomes the biasing force of the biasing element 26, the pressure responsive element 24 may be fully lowered such that it contacts the valve seat 22a and stops the flow of water into the riser 3 altogether. The position of the pressure responsive element 24 will vary between the raised, inactive position and lowered position as the pressure downstream varies to control the flow of water such that a substantially constant pressure can be maintained in the nozzle housing 4. The biasing element 26 may be selected to provide for this desired pressure. In embodiments, 45 psi may be the desired pressure to maintain at the output of the pressure regulating assembly 20. In embodiments, establishing a pressure of 45 psi at the output of the pressure regulating assembly 20, will result in a final pressure of about 40 psi in the nozzle housing 2. In embodiments, the desired pressure may be greater than or less than 45 psi.

Figure 8:
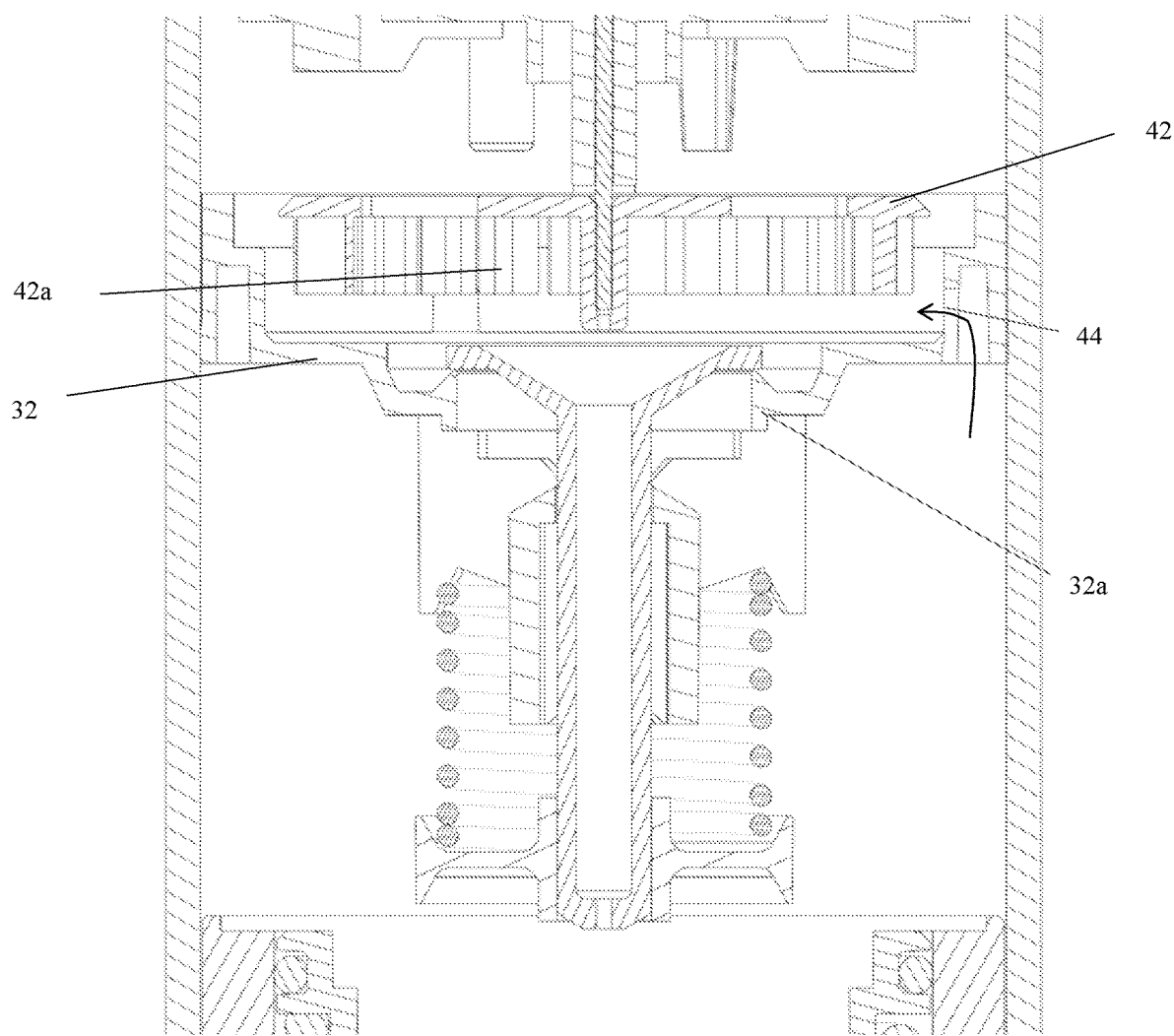
FIG. 8 illustrates a more detailed view of a bypass valve provided downstream of the pressure regulating assembly with in a closed position.
Figure 9:
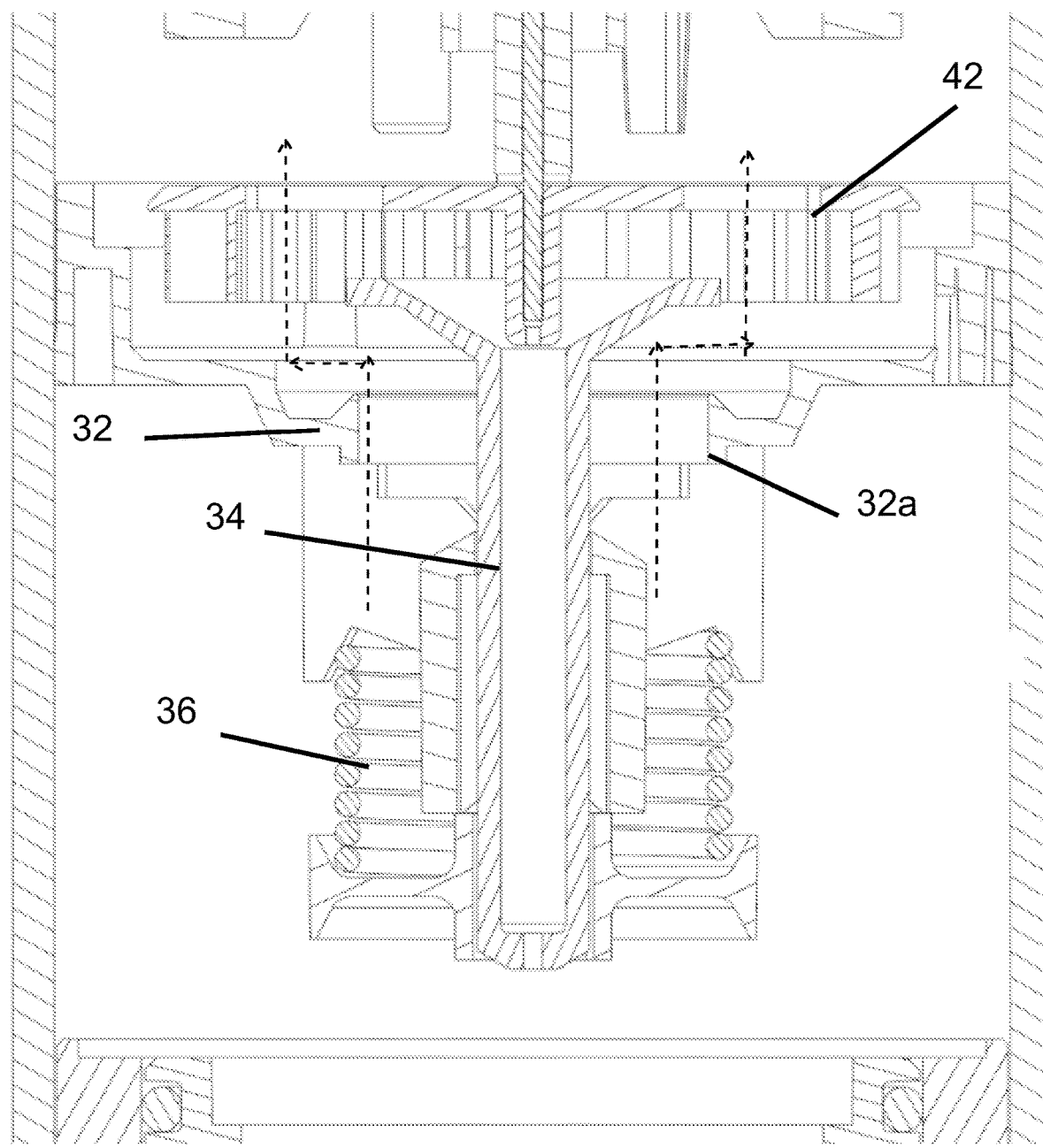
FIG. 9 illustrates the bypass valve of FIG. 8 in an open position.

In embodiments, a bypass valve 30 may be provided downstream from and separated from the pressure responsive element 24. In embodiments, the bypass valve 30 includes a bypass base 32 including a valve seal 32a with a movable element 34 movably mounted therein and movable from a closed position, as illustrated in FIGS. 1A, 1B and 8, in which water is prevented from flowing though the base 32, to an open position in which at least a portion of the water flows though the valve seat 32a as can be seen in FIG. 9. FIG. 8 illustrates a more detailed view of the bypass valve 30 in the closed position. In embodiments, a bypass biasing element 36 may be provided to bias the movable element 34 in the closed position as can be seen in FIGS. 1A, 1B and 8. When the movable element 34 is in the closed position (see FIG. 8, for example) water flows around the bypass valve 30 into the passages 44 discussed above such that substantially all of the water flow is used to exert pressure on the blades 42a of the water turbine 42. When pressure upstream of the bypass valve 30 builds beyond a second threshold, the bias force of the bypass bias element 36 is overcome and the movable member 34 moves upward into an open position as can be seen in FIG. 9, for example. In the open position, at least a portion of the water from the pressure regulating assembly 20 passes through the valve seat 32a of the base 32 and passes thought the water turbine 42 substantially perpendicular to the orientation of the blades 42a as can be seen in FIG. 9 for example such that it does not impart rotation to the blades. FIG. 10 illustrates an exemplary bottom surface of the turbine 42 including a more detailed view of the blades 42a in accordance with an embodiment of the present application. As a result, excessive speed of the turbine 42 may be prevented. As noted above, in embodiments, the bypass valve 30 may be separated from the pressure regulating assembly 20 as shown in FIG. 1A and FIG. 1B.

Figure 11A:
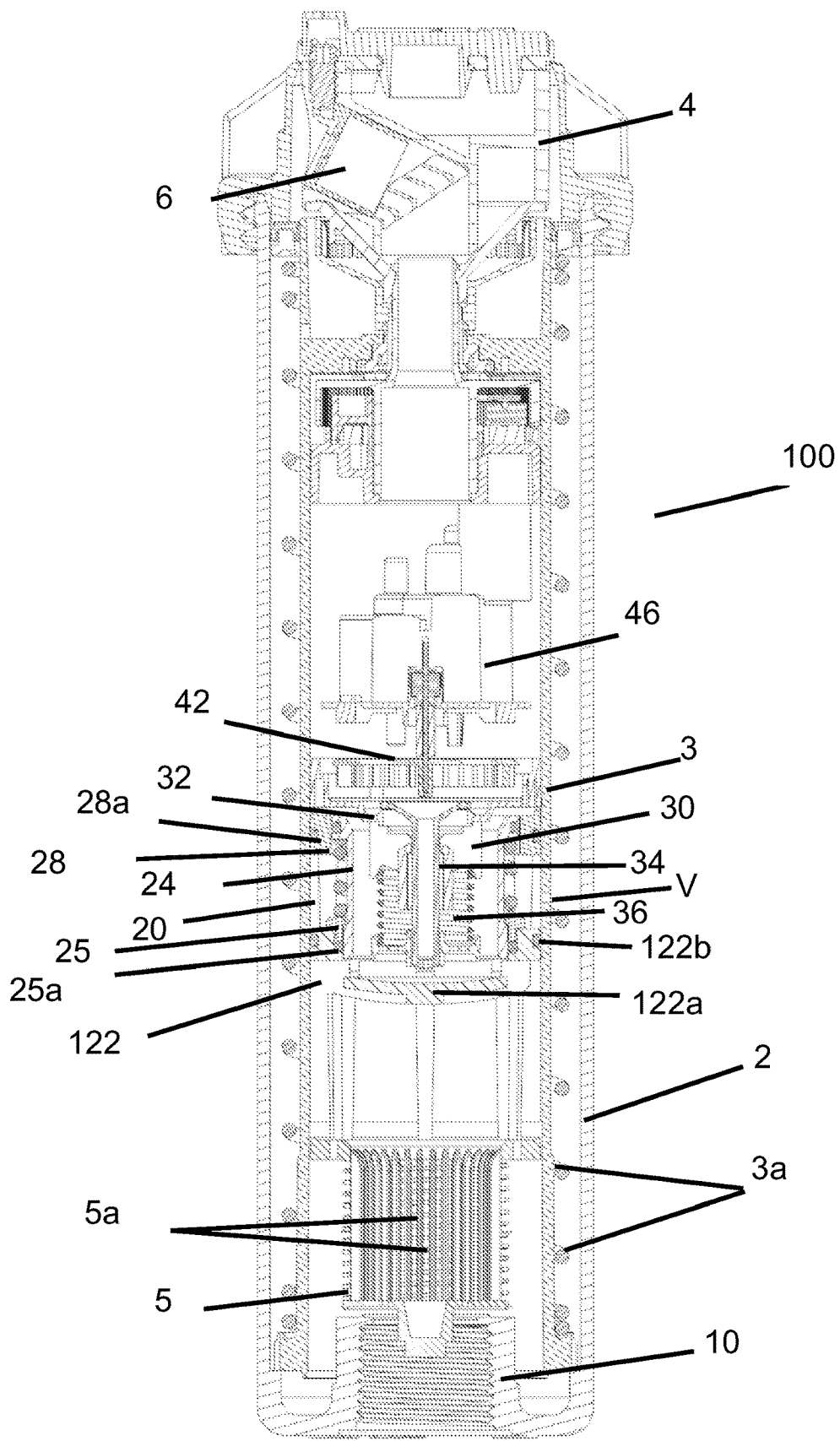
FIG. 11A shows a cross-sectional side elevation view of a sprinkler assembly in accordance with another embodiment of the present invention showing a pressure regulating assembly with a bypass valve positioned at least partially in the pressure regulating assembly with the pressure responsive element in an active state restricting the flow of water.

An oscillating sprinkler assembly 100 in accordance with another embodiment of the present invention is shown in cross-section in FIG. 11A. Common reference numerals are used in FIGS. 1A, 1B, 11A and 11B to refer to common features. FIG. 11A illustrates a body 2 including inlet 10 configured for connection to a supply of water, such as a water supply pipe, for example. In embodiments, the riser 3 is movably mounted in the body 1 such that the riser 3 is movable from a closed or retracted position as illustrated in FIG. 11A, to the extended position shown in FIG. 11B. In embodiments, a biasing element 3a may be used to bias the riser 3 in the retracted position as discussed above. In embodiments, pressure from water provided to the body 2 via the inlet 10 exerts pressure on the riser 3 to move it into the extended position of FIG. 11B.

In embodiments, the filter 5 may be provided at an inlet of the riser 3. In embodiments, water is provided to the body 1 via the inlet 10 and exerts pressure on the riser 3 to raise it to the extended position as noted above with reference to FIG. 1 and illustrated in FIG. 11B. In embodiments, the water passes through openings 5a provided in the filter 5 and flows upward into the riser 3 in a manner similar to that describe above with respect to FIGS. 1A and 1B. In embodiments, a pressure regulating assembly 120 is mounted in the riser 3 downstream of the filter 5. In embodiments, the pressure regulating assembly 120 includes a base 122 mounted above, that is, downstream of the filter 5 including a plurality of openings 122d through which water flows into the pressure regulating assembly 120. In embodiments, a pressure responsive element 24 may be positioned downstream of the base 122 and is movable from a raised position in which water flows freely between the bottom edge thereof and the base 122a into the pressure regulating assembly 120 as can be seen in FIGS. 11A and 12A to a lowered position in which water flow into the pressure regulating assembly 120 is restricted (see FIG. 12B for example) or stopped (see FIG. 12C). In embodiments, movement of the pressure responsive element 24 is based on pressure downstream of the pressure regulating assembly 120. In embodiments, the position of the pressure responsive member 24 varies depending on changes in this downstream pressure to control flow into the pressure regulating assembly 120. FIG. 12B shows the pressure responsive element 24 in a partially lowered position to restrict the flow of water when the downstream pressure exceeds a certain threshold to overcome the bias of the biasing element 26. In embodiments, the area around the biasing element 26 is vented to atmospheric pressure via vent V, which may serve as a reference pressure as noted above. In embodiments, the biasing element 26 biases the pressure responsive element 24 in the raised position to allow free flow of water until downstream pressure exceeds the threshold value and overcomes the bias force of the biasing element 26 to lower the pressure responsive element 24 toward the base 122 and reduce the space between the lower lip of the pressure responsive element 24 and the valve seat 122a of the base 122 to restrict the flow of water. The base 122 is similar in structure to the base 22 of FIGS. 1A and 1B except that it includes a plurality of legs 122e extending toward the filter 5. In embodiments, the legs 122e may be used to maintain a proper position of the base 122 relative to the filter 5 and to establish the proper position of the filter. In embodiments, the legs 102e may also allow for elimination of a spacer or another mechanical stop on the riser 3.

In embodiments, water flows between the lower edge of the pressure responsive element 24 and the valve seat 122a of the base 122 and into and through the hollow center portion of the pressure responsive element 24. Thereafter, the water flows upward toward the water turbine 42. In embodiments, the water flows up through the center of the pressure responsive element 24 and around the bypass valve 30 into transverse passages 44 as indicated in FIGS. 12A, 12B and 12C, for example, that change the direction of the water such that it engages the blades 42a of the turbine, as discussed above with reference to FIGS. 8-10. In embodiments, the force of the water on the blades 42a drives rotation of the blades. In embodiments, the blades 42a are operatively connected to the gear system 46 which is operatively connected to the nozzle housing 4 to rotate the nozzle housing, In embodiments, an arc set mechanism (not shown) may be provided to control an arc of rotation of the nozzle housing 4, if desired such that the nozzle housing rotated back and forth along a desired arc of coverage.

Figure 11B:
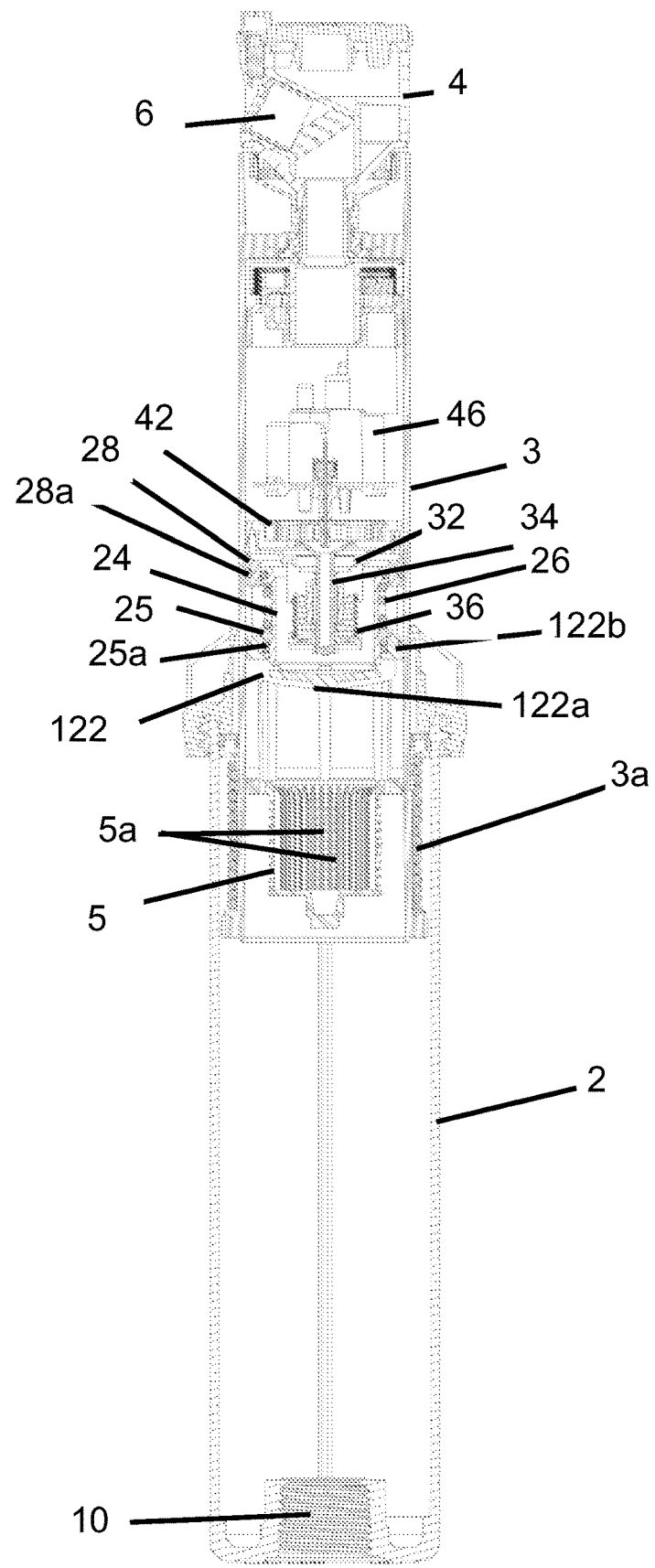
FIG. 11B shows a cross-sectional view of the sprinkler assembly of FIG. 11A with the riser in a raised position and the pressure regulating assembly in a partially lowered position.
Figure 12A:
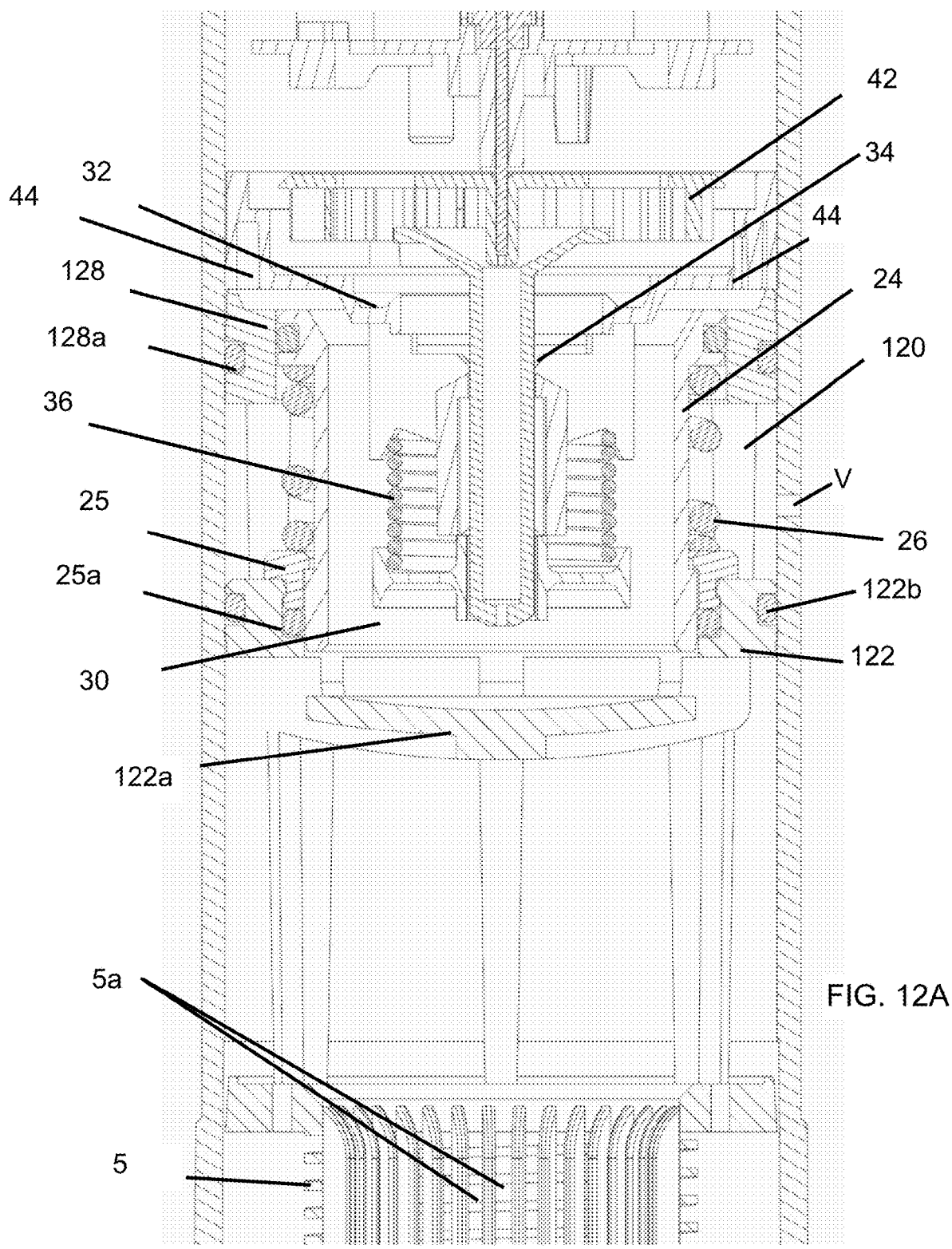
FIG. 12A is a more detailed view of the pressure regulating assembly of FIG. 11A with the pressure responsive member raised in an inactive position allowing free flow of water and the bypass valve in an open position.
Figure 12B:
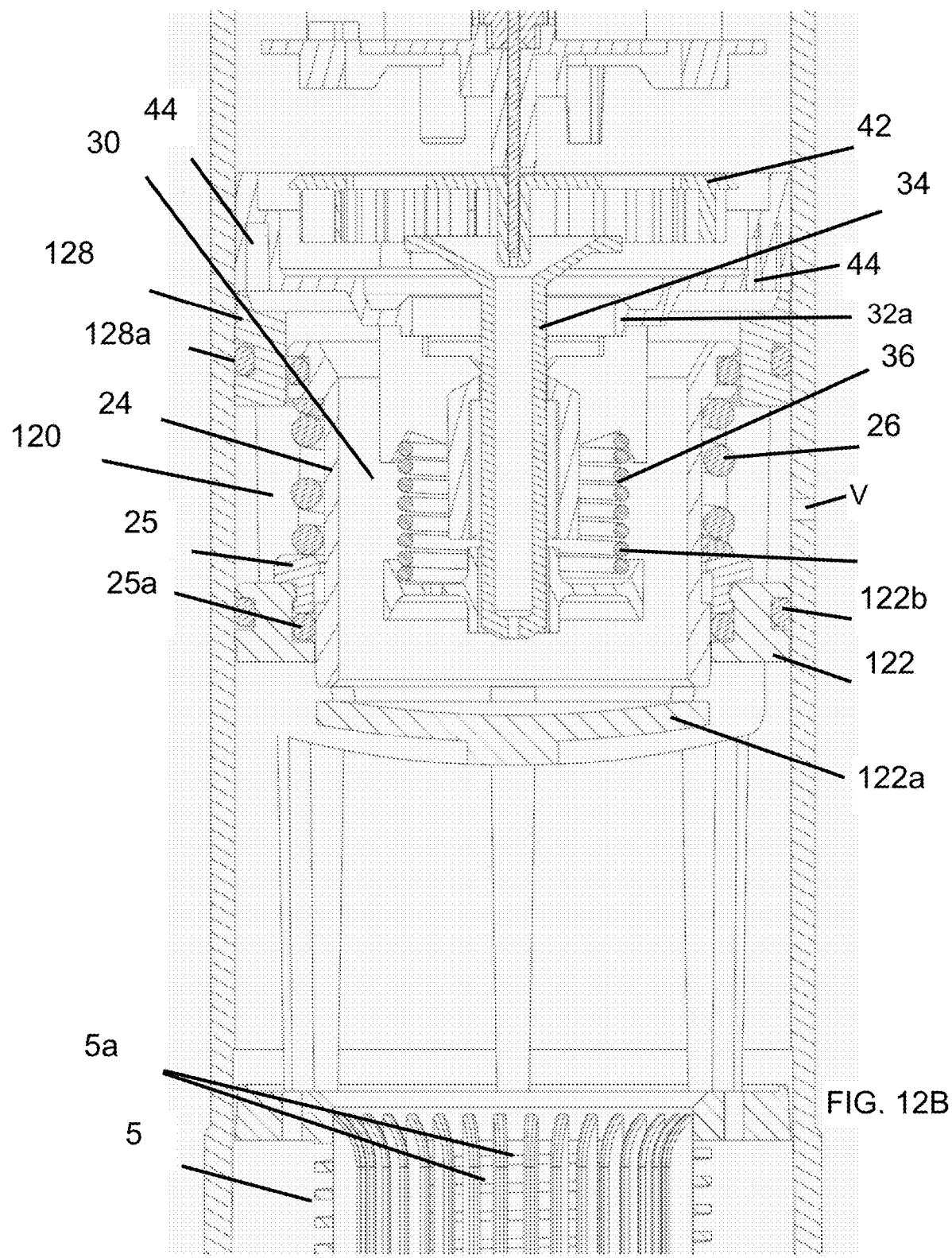
FIG. 12B is a more detailed view of the pressure regulating assembly of FIG. 11B with the pressure responsive member in a partially lowered position and the bypass valve in the open position.
Figure 12C:
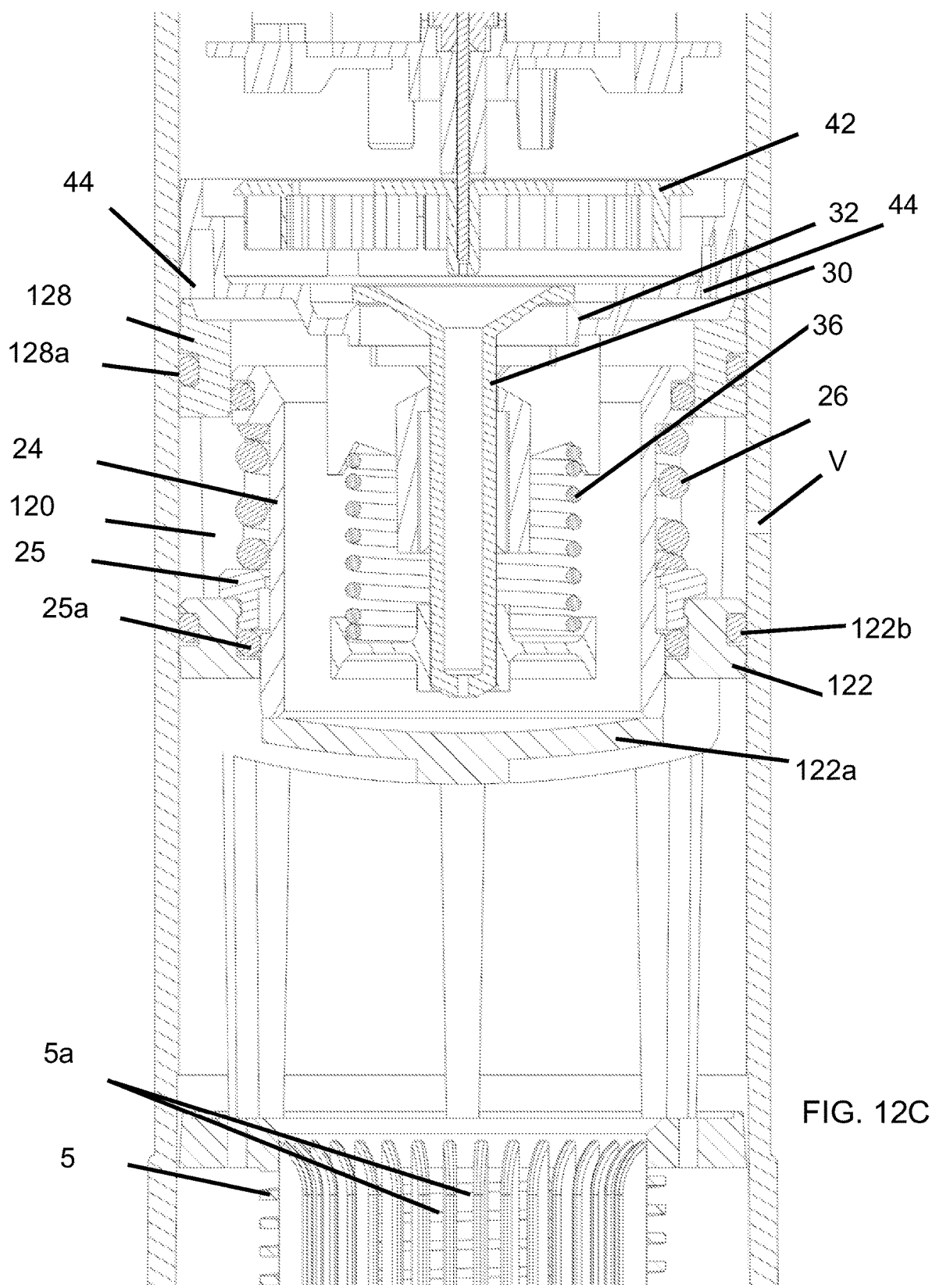
FIG. 12C is a more detailed view of the and the bypass valve in a closed position.
Figure 13A:
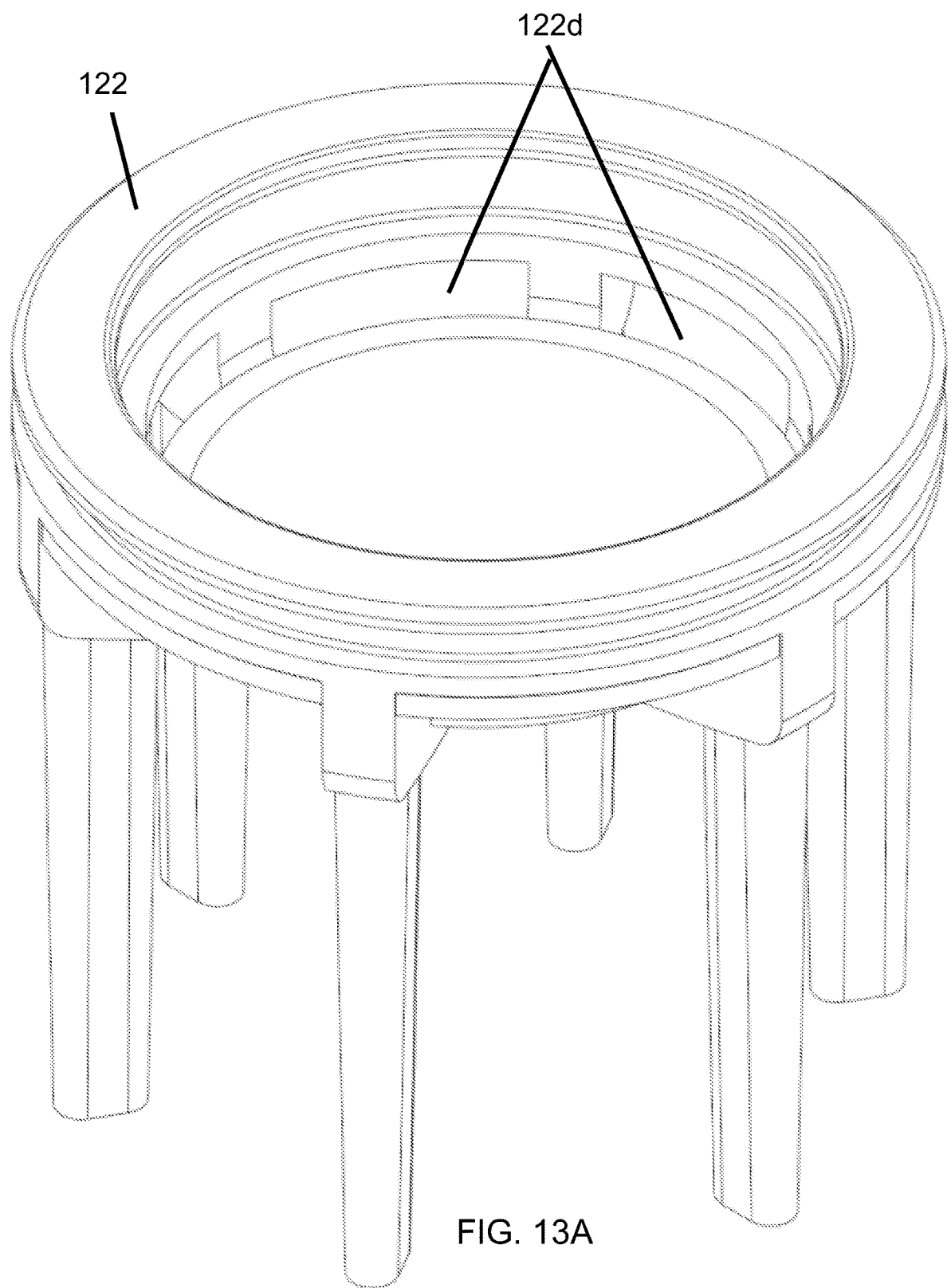
FIG. 13A illustrates a more detailed view of the base of the pressure regulating assembly of FIG. 11A-11B.
Figure 13B:
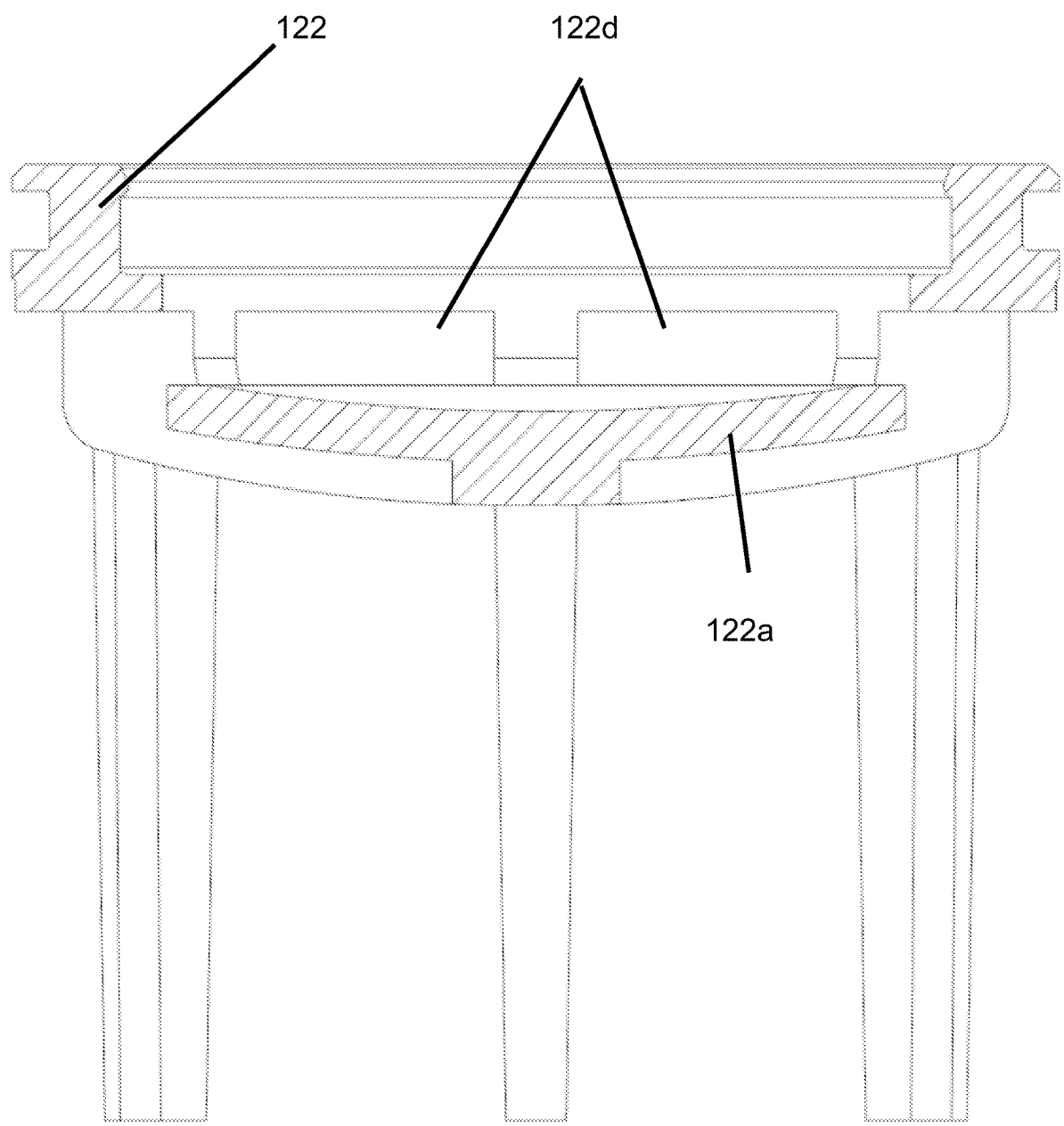
FIG. 13B illustrates a cross-sectional view of the base of FIG. 13A.
Figure 14A:
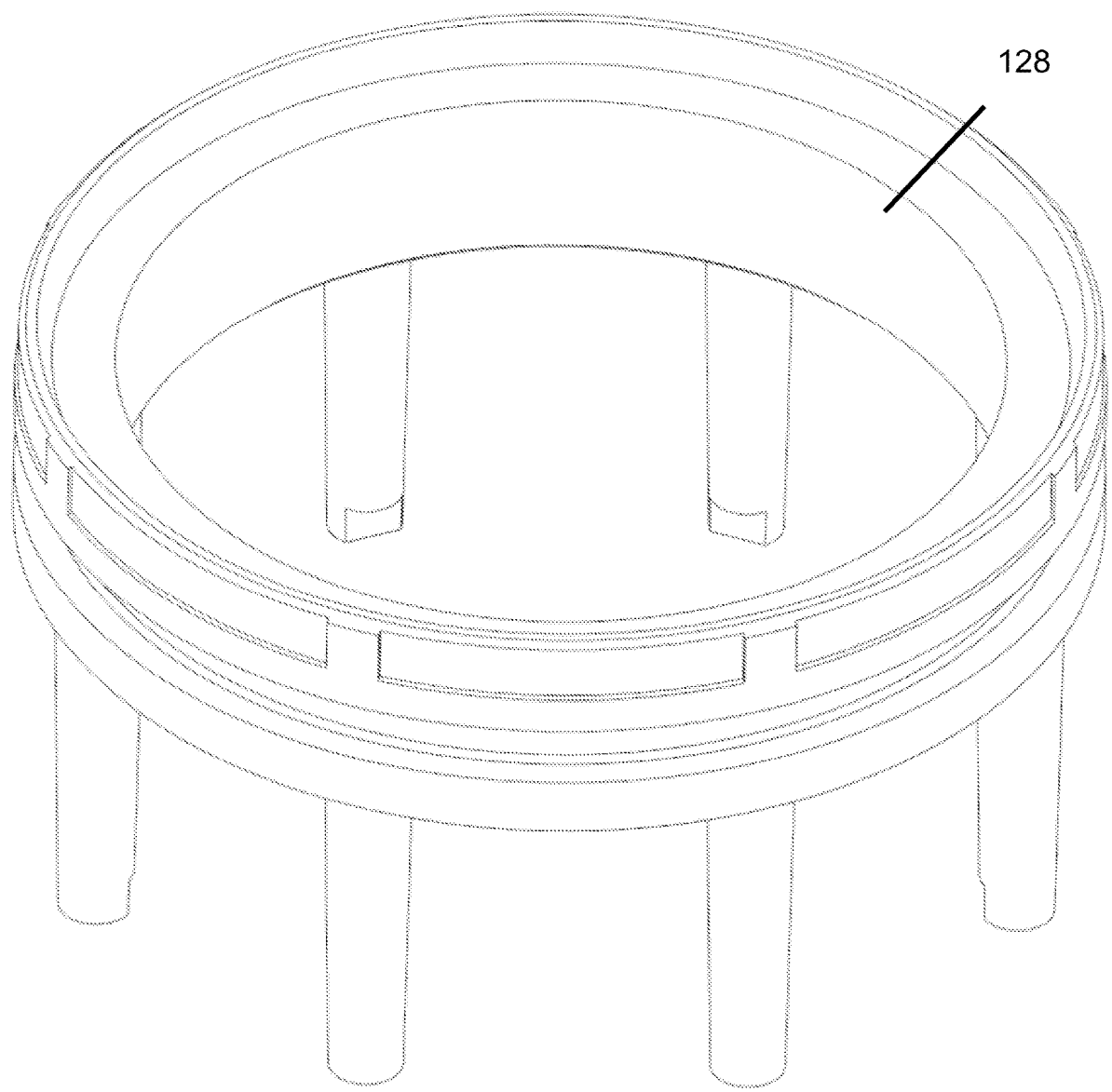
FIG. 14A illustrates a more detailed view of the top ring of the pressure regulating assembly of FIG. 11A-11B.
Figure 14B:
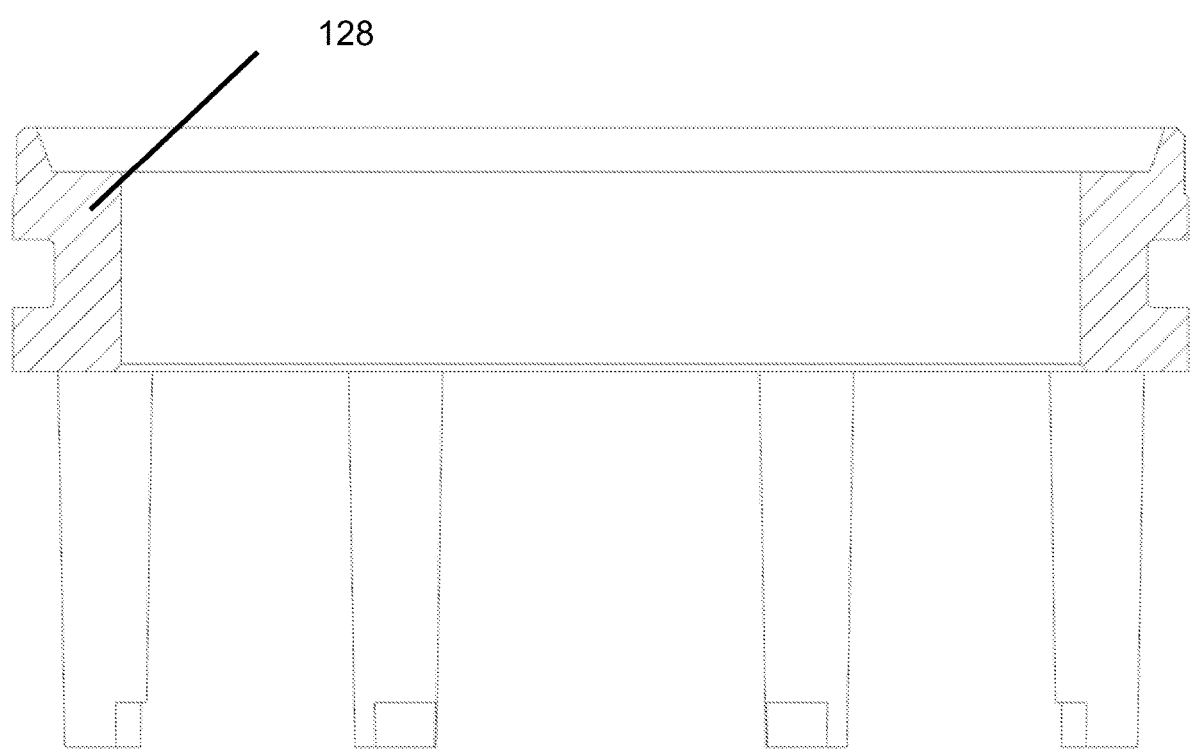
FIG. 14B illustrates a cross-sectional view of the top ring of FIG. 14A.

FIGS. 12A-12C illustrate a more detailed view of the pressure regulating assembly 120 of the sprinkler assembly 100 in FIGS. 11A-11B. In FIG. 12B, the pressure responsive element 24 is in a partially lowered position to restrict water flow. In embodiments, the base 122 of the pressure regulating assembly 120 is longer than the base 22 used in the sprinkler assembly 1 of FIG. 1. FIG. 15 is a more detailed view of the base 222. The base 122, however, interacts with the pressure responsive element 24 is a similar manner to allow for adjustment of a space between the bottom edge of the pressure responsive element 24 and a valve seat 122a of the base 122 to control flow of water into the pressure regulating assembly 120. FIG. 12A illustrates the pressure responsive element 24 in a raised position to allow free flow of water. FIG. 12C shows the pressure responsive element 24 in a fully lowered or closed position to prevent flow of water entirely. In embodiments, the top ring 128 of the pressure regulating assembly 120 may also be extended to interact with the base 32 of the bypass valve 30. FIG. 14A-14B show more detailed views of the top ring 128. The extended length allows the top ring 128 to hold the base 122 in place at a desired position and prevent the based from sliding upward based on pressure at the inlet of the riser 3.

In embodiments, at least a portion of the bypass valve 30 is mounted in the pressure responsive element 24. In embodiments, the bypass valve 30 operates in substantially the same manner as the bypass valve 30 discussed above. Positioning the bypass valve at least partially in the pressure responsive element 24, provides for a compact construction of the pressure regulating assembly 120. In embodiments, the compact pressure regulating assembly 120 may be used as a retrofit to existing sprinklers. In embodiments, the compact pressure regulating assembly 120 may be used and replace a mechanical stop on the riser inner wall and the base.

In operation, water enters the body 2 of the sprinkler assembly 100 via the inlet 10 and pressure builds in the body to extend the riser 3. In embodiments, the water from the body passes through the filter 5 and into the riser 3 through the pressure regulating assembly 120. Water passes through the base and between the bottom edge of the pressure responsive element 24 and the valve seat 122a of the base 122. The spacing between these elements, and thus the flow of water into the pressure regulating assembly 120, as well as the pressure therein will vary to provide a more or less consistent pressure in the nozzle housing 4. The bypass valve 30 controls water flow through the water turbine 42 to control turbine speed and prevent an over speed condition as discussed above.

In embodiments, the securing ring 25 and the top ring 128 of the pressure regulating assembly 120 remains stationary. The top ring 128 is illustrated in more detail in FIGS. 14A and 14B. A seal 128a may be provided between an outer surface of the top ring 128 and the riser 3. In embodiments, a securing seal 25a may be provided between the securing ring 25, the pressure responsive element 24 and the base 122 to prevent water from flowing around the pressure responsive element. The securing ring 25 may be similar to the ring 25 in FIGS. 5A, 5B.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A sprinkler assembly comprising:
   a body including an inlet configured for connection to a water supply;
   a riser movably mounted in the body and movable from a retracted position to an extended position;
   a nozzle housing rotatably mounted on a top of the riser;
   a pressure regulating assembly mounted at an inlet of the riser and operable to control a pressure of a flow of water into the riser from the inlet based on a downstream pressure;
   a bypass valve operable to control water flow; and
   a water turbine mounted downstream of the bypass valve such that the water contacts one or more blades of the water turbine to impart rotation when the bypass valve is in a closed position, wherein the one or more blades are operatively connected to the nozzle housing and drive rotation of the nozzle housing,
   wherein the pressure regulating assembly includes:
     a base mounted at the inlet of the riser;
     a pressure responsive element mounted downstream of the base and movable from a raised position where the flow of water between a bottom edge of the pressure responsive element and the base is substantially unimpeded and a lowered position where the flow of water between the lower edge of the pressure responsive element and the base is reduced such that the flow of water flow is restricted to reduce the downstream pressure;
     a stationary top ring;
     a stationary securing ring in contact with the pressure responsive element; and
     a biasing element positioned between the pressure responsive element and the stationary securing ring and configured to bias the pressure responsive element into the raised position,
   wherein the pressure responsive member moves toward the base when a pressure downstream of the bypass valve assembly exceeds a threshold value.

2. The sprinkler assembly of claim 1, wherein the bypass valve further comprises:
   a bypass base; and
   a bypass movable element mounted in the bypass base and movable between the closed position wherein water is diverted around the bypass base and an open position in which at least a portion of water exiting the pressure response element passes through the bypass base and the turbine substantially perpendicular to the one or more blades of the water turbine such that the one or more blades are impacted without imparting rotation.

3. The sprinkler assembly of claim 2, wherein at least a portion of the bypass valve is positioned in a top portion of the pressure responsive element.

4. The sprinkler assembly of claim 2, wherein the bypass valve is positioned downstream of and spaced away from the pressure responsive element.

5. The sprinkler assembly of claim 1, wherein the pressure responsive element is movable to a closed position to prevent the flow of water between the lower edge of the pressure responsive element and the base.

6. The sprinkler assembly of claim 1, further comprising a base seal positioned between an outer wall of the base and an inner wall of the riser to prevent water from passing between the base the riser.

7. The sprinkler assembly of claim 1, wherein the pressure responsive element further comprises a top seal provided between the top ring and an inner wall of the riser wherein the top seal prevents water from flowing between the top ring and the riser.

8. The sprinkler assembly of claim 1, wherein the pressure responsive element further comprises a securing seal provided between the securing ring and the pressure responsive element that prevents water from passing between the securing ring and the pressure responsive member.

9. The sprinkler assembly of claim 1, further comprising a vent opening formed in the riser aligned with the pressure regulating element.

10. The sprinkler assembly of claim 9, wherein the vent opening is formed adjacent to the pressure responsive element and provides a reference pressure.

11. The sprinkler assembly of claim 10, wherein the vent opening is exposed to atmospheric pressure.

* * * * *